US012543318B2

(12) United States Patent
Liu et al.

(10) Patent No.: US 12,543,318 B2
(45) Date of Patent: Feb. 3, 2026

(54) THREE-DIMENSIONAL MEMORY WITH STACKED SELECT-GATE STRUCTURES

(71) Applicant: YANGTZE MEMORY TECHNOLOGIES CO., LTD., Wuhan (CN)

(72) Inventors: Xiaoxin Liu, Wuhan (CN); Lei Xue, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 422 days.

(21) Appl. No.: 18/090,981

(22) Filed: Dec. 29, 2022

(65) Prior Publication Data

US 2023/0200076 A1    Jun. 22, 2023

Related U.S. Application Data

(63) Continuation of application No. PCT/CN2021/140044, filed on Dec. 21, 2021.

(51) Int. Cl.
*H10B 43/35* (2023.01)
*H10B 43/27* (2023.01)

(52) U.S. Cl.
CPC .......... *H10B 43/35* (2023.02); *H10B 43/27* (2023.02)

(58) Field of Classification Search
CPC . H01L 27/1027; H01L 27/1028; H10B 53/00; H10B 53/10; H10B 53/20;

(Continued)

(56) References Cited

U.S. PATENT DOCUMENTS

2010/0213527 A1* 8/2010 Shim .................. H10B 43/20
257/E27.06
2011/0090737 A1* 4/2011 Yoo .................... G11C 16/10
365/185.11

(Continued)

FOREIGN PATENT DOCUMENTS

CN    105448922 A    3/2016
CN    106409768 A    2/2017

(Continued)

OTHER PUBLICATIONS

Extended European Search Report issued in corresponding European Application No. 21968477.6, mailed on Jun. 16, 225, 10 pages.

(Continued)

*Primary Examiner* — William B Partridge
*Assistant Examiner* — Gustavo G Ramallo
(74) *Attorney, Agent, or Firm* — BAYES PLLC

(57) ABSTRACT

A three-dimensional memory includes a bottom select gate structure, a stack structure disposed on the bottom select gate structure, and a top select gate structure disposed on the stack structure. The stack structure includes a channel layer extending in stack structure in the first direction of the thickness of the stack structure. The channel layer has a first conductive type impurity. At least one of the bottom select gate structure or the top select gate structure includes a semiconductor structure extending in the first direction and connected with the channel layer and having a second conductive type impurity different from the first conductive type impurity.

20 Claims, 18 Drawing Sheets

(58) Field of Classification Search
CPC ........ H10B 53/30; H10B 53/40; H10B 53/50;
H10B 41/00; H10B 41/10; H10B 41/20;
H10B 41/23; H10B 41/27; H10B 41/30;
H10B 41/35; H10B 41/40–44; H10B
41/46–50; H10B 41/60; H10B 41/70;
H10B 43/00; H10B 43/10; H10B 43/20;
H10B 43/23; H10B 43/27; H10B 43/30;
H10B 43/35; H10B 43/40; H10B 43/50;
H10B 51/00; H10B 51/10; H10B 51/20;
H10B 51/30; H10B 51/40; H10B 51/50
See application file for complete search history.

(56) References Cited

U.S. PATENT DOCUMENTS

| | | | |
|---|---|---|---|
| 2012/0213009 A1* | 8/2012 | Aritome | H10B 41/27 257/319 |
| 2013/0163305 A1* | 6/2013 | Tanzawa | G11C 5/063 365/72 |
| 2014/0339621 A1 | 11/2014 | Simsek-Ege et al. | |
| 2020/0328224 A1* | 10/2020 | Lai | G11C 7/12 |
| 2021/0143160 A1 | 5/2021 | Ryu et al. | |
| 2022/0406813 A1 | 12/2022 | Gao et al. | |

FOREIGN PATENT DOCUMENTS

| | | |
|---|---|---|
| CN | 113270421 A | 8/2021 |
| CN | 113410251 A | 9/2021 |
| EP | 3105793 B1 | 9/2021 |
| TW | 202137520 A | 10/2021 |
| WO | 2021155557 A1 | 8/2021 |

OTHER PUBLICATIONS

Communication pursuant to Article 94(3) EPC issued in corresponding European Application No. 21968477.6, mailed Oct. 30, 2025, 10 pages.

* cited by examiner

2000

┌─────────────────────────────────────────────────────────────────────────────┐ ─ S11
│ Forming a bottom select gate structure on a substrate, wherein the bottom select gate structure │
│ includes a semiconductor structure having a second conductive type impurity │
└─────────────────────────────────────────────────────────────────────────────┘

┌─────────────────────────────────────────────────────────────────────────────┐ ─ S12
│ Forming an initial stack structure on the bottom select gate structure │
└─────────────────────────────────────────────────────────────────────────────┘

┌─────────────────────────────────────────────────────────────────────────────┐ ─ S13
│ Forming a channel layer extending in the initial stack structure in a thickness direction │
│ of the initial stack structure, wherein the channel layer has a first conductive type impurity │
│ opposite to the second conductive type impurity and is connected with the semiconductor │
│ structure located at the bottom select gate structure │
└─────────────────────────────────────────────────────────────────────────────┘

Fig.4

THREE-DIMENSIONAL MEMORY WITH STACKED SELECT-GATE STRUCTURES

CROSS-REFERENCE TO RELATED APPLICATIONS

This application is a continuation of International Application No. PCT/CN2021/140044, filed on Dec. 21, 2021, which is incorporated herein by reference in its entirety.

TECHNICAL FIELD

The present disclosure relates to the field of semiconductor design and manufacturing, and more particularly to a three-dimensional (3D) memory, a manufacturing method of a 3D memory, and a memory system.

BACKGROUND

A select gate structure, such as at least one of a bottom select gate structure and a top select gate structure, is generally provided in a three-dimensional memory to enable the turn-off and turn-on operations of the three-dimensional memory during data operation.

However, with the increase in the number of stacked layers in the 3D memory and the thin dielectric film layers included in the 3D memory becoming more and more complex, 3D memory's turn-off and turn-on performance is adversely affected.

SUMMARY

The present disclosure provides a three-dimensional memory and a manufacturing method capable of at least partially solving the above problems existing in the related art.

An aspect of the present disclosure provides a three-dimensional memory that comprises: a bottom select gate structure; a stack structure disposed on the bottom select gate structure, and comprising a channel layer extending in the stack structure in a first direction, the channel layer having a first conductive type impurity, the first direction being a direction of a thickness of the stack structure; and a top select gate structure disposed on the stack structure, wherein at least one of the bottom select gate structure and the top select gate structure comprises a semiconductor structure extending in the first direction and connected with the channel layer, wherein the semiconductor structure has a second conductive type impurity opposite to the first conductive type impurity.

In an implementation, the semiconductor structure is a first semiconductor fill layer disposed in the bottom select gate structure, wherein the bottom select gate structure comprises: a first vertically-extending hole extending in the first direction; a first barrier layer disposed on inner walls of the first vertically-extending hole; and the first semiconductor fill layer filled in a remaining space of the first vertically-extending hole.

In an implementation, the semiconductor structure is a first semiconductor thin film layer disposed in the bottom select gate structure, wherein the bottom select gate structure comprises: a first vertically-extending hole extending in the first direction; a first barrier layer, and the first semiconductor thin film layer disposed on inner walls of the first vertically-extending hole in sequence; and a first insulating dielectric fill layer filled in a remaining space of the first vertically-extending hole.

In an implementation, the semiconductor structure is a semiconductor fill layer or a first semiconductor thin film layer, the memory further comprising: a semiconductor connect layer located below and connected with the first semiconductor fill layer or the first semiconductor thin film layer, wherein the semiconductor connect layer has the first conductive type impurity.

In an implementation, an impurity doping concentration of the semiconductor connect layer is greater than an impurity doping concentration of the first semiconductor fill layer or the first semiconductor thin film layer.

In an implementation, the semiconductor structure is a second semiconductor fill layer disposed in the top select gate structure, wherein the top select gate structure comprises: a second vertically-extending hole extending in the first direction; a second barrier layer disposed on inner walls of the second vertically-extending hole; and the second semiconductor fill layer and a conductive plug filled in a remaining space of the second vertically-extending hole, wherein the conductive plug is located above the second semiconductor fill layer and is connected with the second semiconductor fill layer.

In an implementation, the semiconductor structure is a second semiconductor thin film layer disposed in the top select gate structure, wherein the top select gate structure comprises: a second vertically-extending hole extending in the first direction; a second barrier layer disposed on inner walls of the second vertically-extending hole; the second semiconductor thin film layer and a conductive plug disposed on a surface of the second barrier layer; and a second insulating dielectric fill layer disposed on a surface of the second semiconductor thin film layer, wherein the conductive plug is located above the second semiconductor thin film layer and the second insulating dielectric fill layer, and the conductive plug is connected with the second semiconductor thin film layer.

In an implementation, the semiconductor structure is the second semiconductor fill layer or the second semiconductor thin film layer, the memory further comprising: a channel plug located above the channel layer, the channel layer being connected with the second semiconductor fill layer or the second semiconductor thin film layer through the channel plug, wherein both the conductive plug and the channel plug have the first conductive type impurity.

In an implementation, impurity doping concentrations of both the conductive plug and the channel plug are greater than an impurity doping concentration of the second semiconductor fill layer or the second semiconductor thin film layer.

In an implementation, the bottom select gate structure comprises at least one first stack layer each comprising a bottom select gate layer and a bottom dielectric layer, and the top select gate structure comprises at least one second stack layer each comprising a top select gate layer and a top dielectric layer, wherein at least one of the bottom select gate layer and the top select gate layer is a semiconductor gate layer; and an impurity doping concentration of the semiconductor gate layer is greater than an impurity doping concentration of the semiconductor structure.

In an implementation, the bottom select gate structure comprises at least one first stack layer each comprising a bottom select gate layer and a bottom dielectric layer, and the top select gate structure comprises at least one second stack layer each comprising a top select gate layer and a top dielectric layer, at least one of the bottom select gate layer and the top select gate layer is a metal gate layer.

In an implementation, the semiconductor structure is a first semiconductor structure fill layer or a first semiconductor thin film layer located in the bottom select gate structure, the memory further comprising: a semiconductor connect layer located below and connected with the first semiconductor structure fill layer or the first semiconductor thin film layer, wherein the first semiconductor structure fill layer or the first semiconductor thin film layer has an impurity doping concentration of $10^{13}$ cm$^{-3}$ to $10^{11}$ cm$^{-3}$; the semiconductor connect layer has an impurity doping concentration of $10^{19}$ cm$^{-3}$ to $10^{21}$ cm$^{-3}$; and the semiconductor gate layer has an impurity doping concentration of $10^{19}$ cm$^{-3}$ to $10^{21}$ cm$^3$.

In an implementation, the semiconductor structure is a second semiconductor structure fill layer or a second semiconductor thin film layer located in the top select gate structure, the memory further comprising: a conductive plug located above and connected with the second semiconductor structure fill layer or the second semiconductor thin film layer; and a channel plug located above the channel layer, the channel layer being connected with the second semiconductor fill layer or the second semiconductor thin film layer through the channel plug, wherein the second semiconductor structure fill layer or the second semiconductor thin film layer has an impurity doping concentration of $10^{13}$ cm$^{-3}$ to $10^{15}$ cm$^{-3}$; the conductive plug and the channel plug have impurity doping concentrations of $10^{19}$ cm$^{-3}$ to $10^{21}$ cm$^{-3}$; and the semiconductor gate layer has an impurity doping concentration of $10^{19}$ cm$^{-3}$ to $10^{21}$ cm$^{-3}$.

In an implementation, the bottom select gate structure comprises at least two of the first stack layers; or the top select gate structure comprises at least two of the second stack layers.

Another aspect of the present disclosure provides a memory system. The memory system comprises a controller and a memory provided according to an aspect of the present disclosure. The controller is coupled to the memory and is configured to control the memory to store data.

In an implementation the memory comprises at least one of a three-dimensional NAND memory and a three-dimensional NOR memory.

A yet another aspect of the present disclosure provides a method for manufacturing a three-dimensional memory. The method comprises: forming a bottom select gate structure on a substrate, wherein the bottom select gate structure comprises a semiconductor structure having a second conductive type impurity; forming an initial stack structure on the bottom select gate structure; and forming a channel layer extending in the initial stack structure in a thickness direction of the initial stack structure, wherein the channel layer has a first conductive type impurity opposite to the second conductive type impurity and is connected with the semiconductor structure located at the bottom select gate structure.

In an implementation, after forming the channel layer, the method further comprises: forming a top select gate structure on the initial stack structure, wherein the top select gate structure comprising a semiconductor structure having the second conductive type impurity and connected with the channel layer, a semiconductor structure located at the top select gate structure is a second semiconductor fill layer or a second semiconductor thin film layer.

In an implementation, the semiconductor structure at the bottom select gate structure is the first semiconductor fill layer or the first semiconductor thin film layer, after forming the first semiconductor fill layer or the first semiconductor thin film layer, the method further comprises: removing at least a portion of the substrate and exposing a portion of the first semiconductor fill layer located on the substrate or a portion of the first semiconductor thin film layer located on the substrate; and forming a semiconductor connect layer connected with the exposed first semiconductor fill layer or first semiconductor thin film layer, wherein the semiconductor connect layer has the first conductive type impurity.

In an implementation, an impurity doping concentration of the semiconductor connect layer is greater than an impurity doping concentration of the first semiconductor fill layer or the first semiconductor thin film layer.

In an implementation, the method further comprises: forming a channel plug above the channel layer after forming the channel layer, wherein the channel layer is connected with the second semiconductor fill layer or the second semiconductor thin film layer through the channel plug; and forming a conductive plug connected with the second semiconductor fill layer or the second semiconductor thin film layer above the second semiconductor fill layer or the second semiconductor thin film layer, wherein both the conductive plug and the channel plug have the first conductive type impurity.

In an implementation, impurity doping concentrations of the conductive plug and the channel plug are greater than an impurity doping concentration of the second semiconductor fill layer or the second semiconductor thin film layer.

In an implementation, the bottom select gate structure comprises at least one first stack layer, the semiconductor structure of the bottom select gate structure is a first semiconductor fill layer, wherein the first semiconductor fill layer comprises: forming a first vertically-extending hole extending in the bottom select gate structure in a thickness direction of the first stack layer; forming a first barrier layer on inner walls of the first vertically-extending hole; and filling a remaining portion of the first vertically-extending hole with a semiconductor fill material having the second conductive type impurity to form the first semiconductor fill layer.

In an implementation, filling the remaining portion of the first vertically-extending hole with the semiconductor fill material having the second conductive type impurity using an in-situ doping process.

In an implementation, the bottom select gate structure comprises at least one first stack layer, the semiconductor structure of the bottom select gate structure is a first semiconductor thin film layer, wherein forming the first semiconductor thin film layer comprises: forming a first vertically-extending hole extending in the bottom select gate structure in a thickness direction of the first stack layer; forming a first barrier layer on inner walls of the first vertically-extending hole; forming the first semiconductor thin film layer on a surface of the first barrier layer; and filling a remaining portion of the first vertically-extending hole with a first insulating dielectric fill layer.

In an implementation, forming the first semiconductor thin film layer on the surface of the first barrier layer using an in-situ doping process.

In an implementation, the bottom select gate structure comprises at least one first stack layer each comprising a bottom select gate layer and a bottom dielectric layer, wherein the bottom select gate layer is a metal gate layer.

In an implementation, the bottom select gate structure comprises at least one first stack layer each comprising a bottom select gate layer and a bottom dielectric layer, wherein the bottom select gate layer is a bottom semiconductor gate layer, forming the bottom semiconductor gate layer on the substrate comprising: forming the bottom semiconductor gate layer using an in-situ doping process, wherein an impurity doping concentration of the bottom semiconductor gate layer is greater than an impurity doping concentration of the semiconductor structure located at the bottom select gate structure.

In an implementation, the memory further comprises a semiconductor connect layer connected with the semiconductor structure located at the bottom select gate structure below the semiconductor structure located at the bottom select gate structure, wherein the semiconductor structure located at the bottom select gate structure has an impurity doping concentration of $10^{13}$ cm$^{-3}$ to $10^{15}$ cm$^{-3}$; the semiconductor connect layer has an impurity doping concentration of $10^{19}$ cm$^{-3}$ to $10^{21}$ cm$^{-3}$; and the bottom semiconductor gate layer has an impurity doping concentration of $10^{19}$ cm$^{-3}$ to $10^{21}$ cm$^{-3}$.

In an implementation, wherein the top select gate structure comprises at least one second stack layer each comprising a top select gate layer and a top dielectric layer, wherein the top select gate layer is a metal gate layer.

In an implementation, the top select gate structure comprises at least one second stack layer each comprising a top select gate layer and a top dielectric layer, wherein the top select gate layer is a top semiconductor gate layer, forming the top semiconductor gate layer on the stack structure comprises: forming the top semiconductor gate layer using an in-situ doping process, wherein an impurity doping concentration of the top semiconductor gate layer is greater than an impurity doping concentration of the semiconductor structure located at the top select gate structure.

In an implementation, the semiconductor structure located at the top select gate structure has an impurity doping concentration of $10^{13}$ cm$^{-3}$ to $10^{15}$ cm$^{-3}$; the conductive plug and the channel plug have impurity doping concentrations of $10^{19}$ cm$^{-3}$ to $10^{21}$ cm$^{-3}$; and the top semiconductor gate layer has an impurity doping concentration of $10^{19}$ cm$^{-3}$ to $10^{21}$ cm$^{-3}$.

In an implementation, the bottom select gate structure comprises at least two first stack layers.

In an implementation, the top select gate structure comprises at least two second stack layers.

Another aspect of the present disclosure provides a method for manufacturing a three-dimensional memory comprising: forming an initial stack structure on a side of a substrate; forming a channel layer extending in the initial stack structure in a thickness direction of the initial stack structure, wherein the channel layer has a first conductive type impurity; and forming a top select gate structure on the initial stack structure, wherein the top select gate structure comprises a semiconductor structure connected with the channel layer, the semiconductor structure having a second conductive type impurity opposite to the first conductive type impurity.

In an implementation, the method further comprises: forming a channel plug above the channel layer after forming the channel layer, wherein the channel layer is connected with the semiconductor structure located at the top select gate structure through the channel plug; and forming a conductive plug connected with the semiconductor structure located at the top select gate structure above the semiconductor structure located at the top select gate structure, wherein both the conductive plug and the channel plug have the first conductive type impurity.

In an implementation, impurity doping concentrations of the conductive plug and the channel plug are greater than an impurity doping concentration of the semiconductor structure located at the top select gate structure.

In an implementation, the top select gate structure comprises at least one second stack layer, the semiconductor structure located at the top select gate structure is a second semiconductor fill layer, wherein forming the second semiconductor fill layer comprises: forming a second vertically-extending hole extending in a thickness direction of the second stack layer; forming a second barrier layer on side walls of the second vertically-extending hole; and filling a remaining portion of the second vertically-extending hole with the conductive plug and the second semiconductor fill layer, wherein the conductive plug is located above the second semiconductor fill layer and connected with the second semiconductor fill layer.

In an implementation, forming the second semiconductor fill layer and the conductive plug in the remaining portion of the second vertically-extending hole using an in-situ doping process, respectively.

In an implementation, the top select gate structure comprises at least one second stack layer, the semiconductor structure located at the top select gate structure is a second semiconductor thin film layer, and forming the second semiconductor thin film layer comprises: forming a second vertically-extending hole extending in a thickness direction of the second stack layer; forming a second barrier layer on side walls of the second vertically-extending hole; forming an initial second semiconductor thin film layer on a surface of the second barrier layer; filling a remaining space of the second vertically-extending hole with an initial insulating dielectric fill layer; removing a portion of the initial second semiconductor thin film layer and a portion of the initial insulating dielectric fill layer to form the second semiconductor thin film layer and the second insulating dielectric fill layer, and exposing a surface of the second barrier layer above the second vertically-extending hole; and forming the conductive plug on the exposed surface of the second barrier layer.

In an implementation, forming the initial second semiconductor thin film layer and the conductive plug, respectively, using an in-situ doping process.

In an implementation, the process of forming the second vertically-extending hole stops at the channel plug.

In an implementation, the top select gate structure comprises at least one second stack layer each comprising a top select gate layer and a top dielectric layer, forming the top select gate structure on the stack structure comprises: forming the top select gate layer using an in-situ doping process, wherein an impurity doping concentration of the top select gate layer is greater than an impurity doping concentration of the semiconductor structure located at the top select gate structure.

In an implementation, the semiconductor structure located at the top select gate structure has an impurity doping concentration in the range of $10^{13}$ cm$^{-3}$ to $10^{15}$ cm$^{-3}$; the top select gate layer has an impurity doping concentration of $10^{19}$ cm$^{-3}$ to $10^{21}$ cm$^{-3}$; and the conductive plug and the channel plug have impurity doping concentrations in the range of $10^{19}$ cm$^{-3}$ to $10^{21}$ cm$^{-3}$.

In an implementation, the top select gate structure comprises at least two second stack layers.

BRIEF DESCRIPTION OF THE DRAWINGS

Other features, purposes, and benefits of the present disclosure will become more apparent by reading the detailed description of the non-limiting implementations with reference to the following drawings. In the drawings:

FIG. 4 is a flowchart of a manufacturing method of a 3D memory according to an implementation of the present disclosure;

DETAILED DESCRIPTION

Figure 1A:
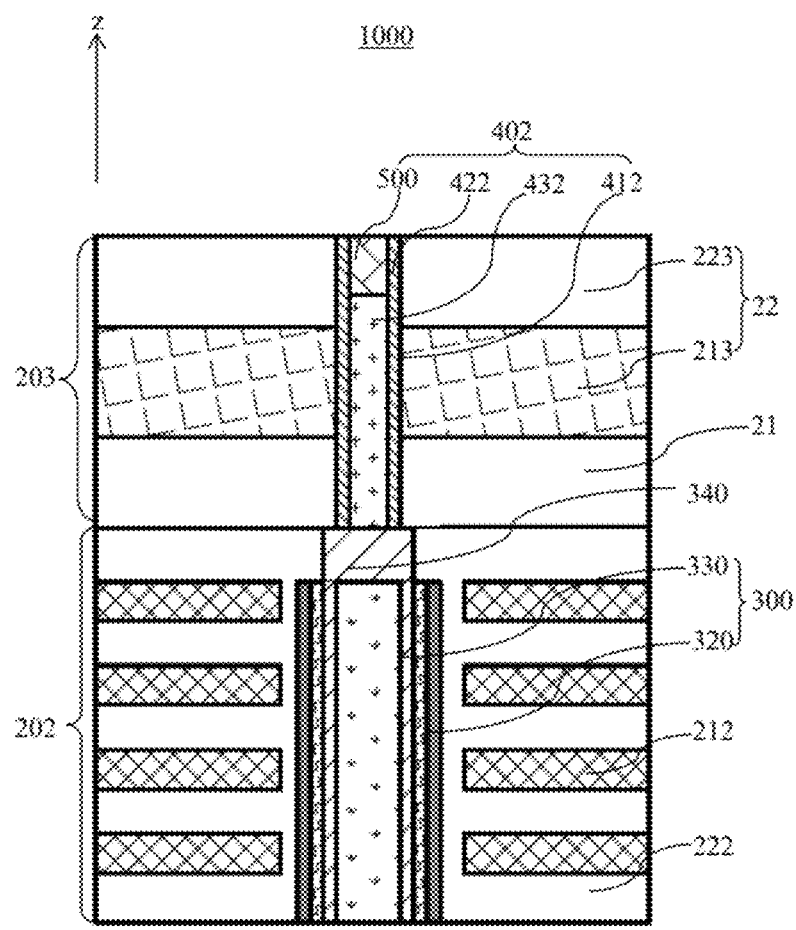
FIG. 1A is a cross-sectional view of a 3D memory according to an implementation of the present disclosure.

The present disclosure will be described in detail below in conjunction with the accompanying drawings. The exemplary implementations mentioned herein are only for explanation of the present disclosure and are not intended to limit the scope of the present disclosure. Throughout the specification, similar reference numerals refer to like elements.

The thickness, size, and shape of the parts have been slightly adjusted in the drawings for ease of illustration. The drawings are illustrative only and are not drawn strictly to scale. As used herein, the terms "approximately," "about," and similar terms are used to denote approximation rather than degree and are intended to illustrate inherent deviations in measured or calculated values that will be recognized by those of ordinary skill in the art.

It should also be understood that the expression "and/or" includes any and all combinations of one or more of the associated listed items. The expressions such as "comprise," "include," and/or "have" are open rather than closed expressions in this specification that indicate the presence of the stated feature, element and/or component but do not exclude the presence or addition of one or more other feature, element, components and/or combinations thereof. Further, when the expression such as "at least one of . . . " appears after the list of listed features, it modifies the entire list of features rather than only individual elements in the list. When describing implementations of the present disclosure, "may" is used to mean "one or more implementations of the present disclosure." And the term "exemplary" is intended to refer to examples or illustrations.

In addition, in the present disclosure, when the expressions such as "connected," "covering," and/or "formed on . . . " and the like are used, they may indicate direct or indirect contact between the respective components, unless otherwise expressly defined or can be derived from the context.

All terms used herein (including technical terms and scientific terms) have the same meanings as would normally be understood by those of ordinary skill in the art to which the present disclosure pertains, unless otherwise defined. Further, unless expressly stated in the present disclosure, words defined in commonly-used dictionaries should be construed as having meanings consistent with their meanings in the context of the relevant technology and should not be construed as idealized or overly formal meanings.

It should be noted that the implementations and the features in the implementations according to the present disclosure can be combined with each other without conflict. Moreover, the specific steps in the method described herein are not necessarily limited to the order described but may be performed in any order or in parallel unless expressly defined or contrary to the context. The present disclosure will be described in detail below with reference to the accompanying drawings and in conjunction with the implementations.

There is an urgent problem to be solved at present how to realize the turn-off and turn-on operation of 3D memory better without affecting the performance of 3D memory to improve the performance of the 3D memory during erasing, programming and reading A 3D memory and a method for manufacturing the same, and a memory system provided according to at least one implementation of the present disclosure can form a PN junction barrier capacitance in a conductive circuit connecting the channel layer by providing a semiconductor structure (a first semiconductor fill layer, a second semiconductor fill layer, a first semiconductor thin film layer or a second semiconductor thin film layer) connected with the channel layer in a select gate structure (at least one of a bottom select gate structure and a top select gate structure) and making the semiconductor structure and the channel layer have an impurity of opposite conductive type. Therefore, the width of the space charge region in the PN junction barrier capacitance can be changed by applying a control trigger voltage to the select gate structure, so that the turn-on/turn-off performance of the 3D memory can be optimized by controlling the turn-on speed of the channel layer through modulating the width of the space charge region above described according to the requirements of erasing, programming and reading operation of the 3D memory.

Further, a semiconductor structure disposed in a select gate structure and connected with the channel layer in accordance with at least one implementation of the present disclosure may be understood as a solid semiconductor structure (it is understood that cavities or voids formed in the fabrication process are allowed to be inside the solid semiconductor structure), which can enhance the gate controllability of the select gate structure in controlling the turn-on speed of the channel layer. In addition, the solid semiconductor structure can also simplify the fabrication process of 3D memory.

Further, according to at least one implementation of the present disclosure, it can reduce the leakage existing in the top select gate structure by setting the impurity doping concentrations of both the conductive plug and the channel plug of the 3D memory to be greater than that of the semiconductor structure connected with the channel layer in the top select gate structure; and it also can reduce the leakage existing in the bottom select gate structure by setting the impurity doping concentration of the semiconductor connect layer of the 3D memory to be greater than that of the semiconductor structure connected with the channel layer in the bottom select gate structure.

Further, the 3D memory and the method for manufacturing the same and a memory system provided according to at least one implementation of the present disclosure can reduce the bulk resistivity of the select gate layer and improve the conductivity by setting the select gate layer in the select gate structure as the semiconductor gate layer and setting the impurity doping concentration of the semiconductor gate layer to be greater than that of the semiconductor structure connected with the channel layer in the select gate structure.

Figure 1B:
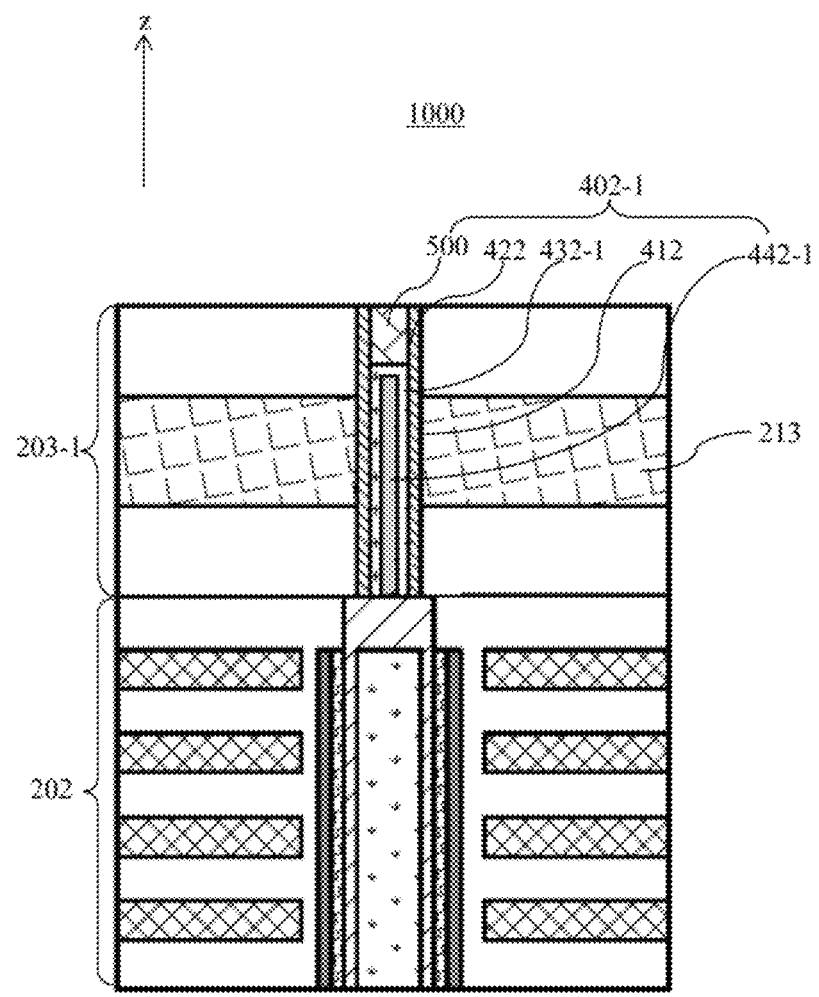
FIG. 1B is a cross-sectional view of a 3D memory according to another implementation of the present disclosure.
Figure 2:
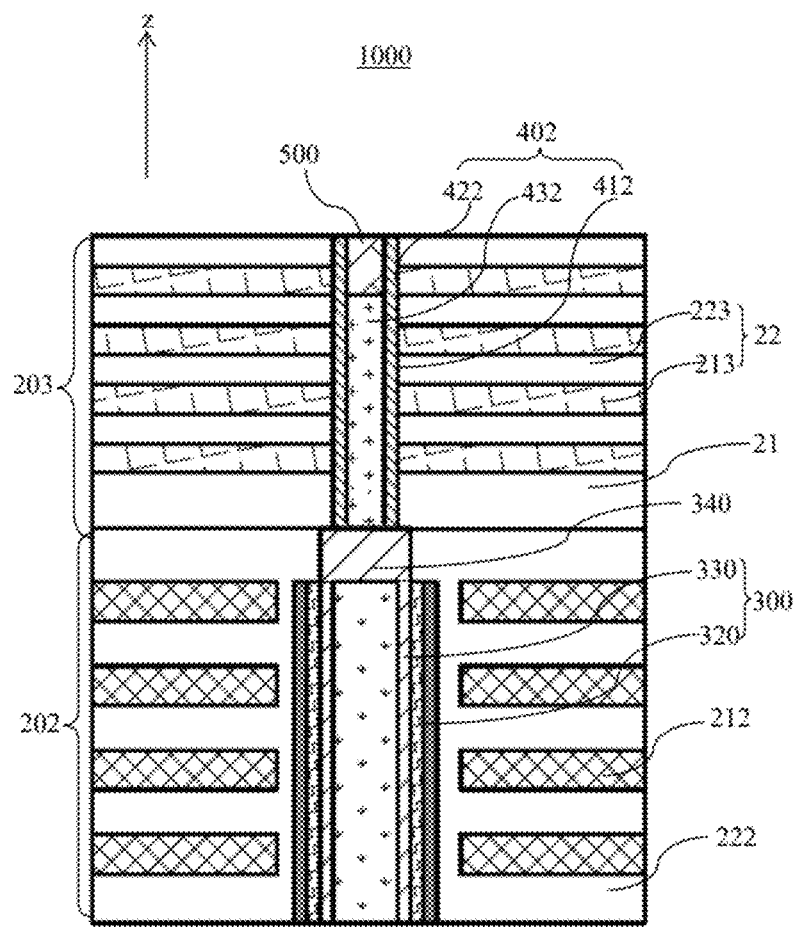
FIG. 2 is a cross-sectional view of a 3D memory according to yet another implementation of the present disclosure.
Figure 3A:
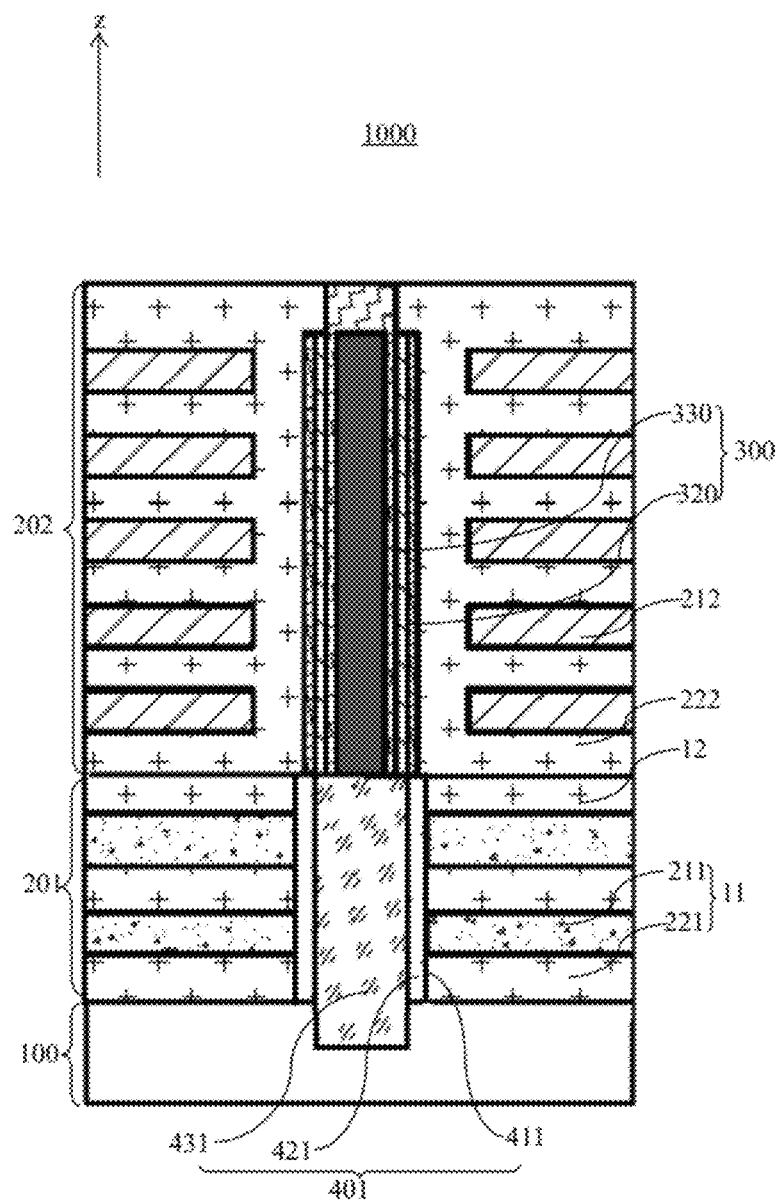
FIG. 3A is a cross-sectional view of a 3D memory according to yet another implementation of the present disclosure.
Figure 3B:
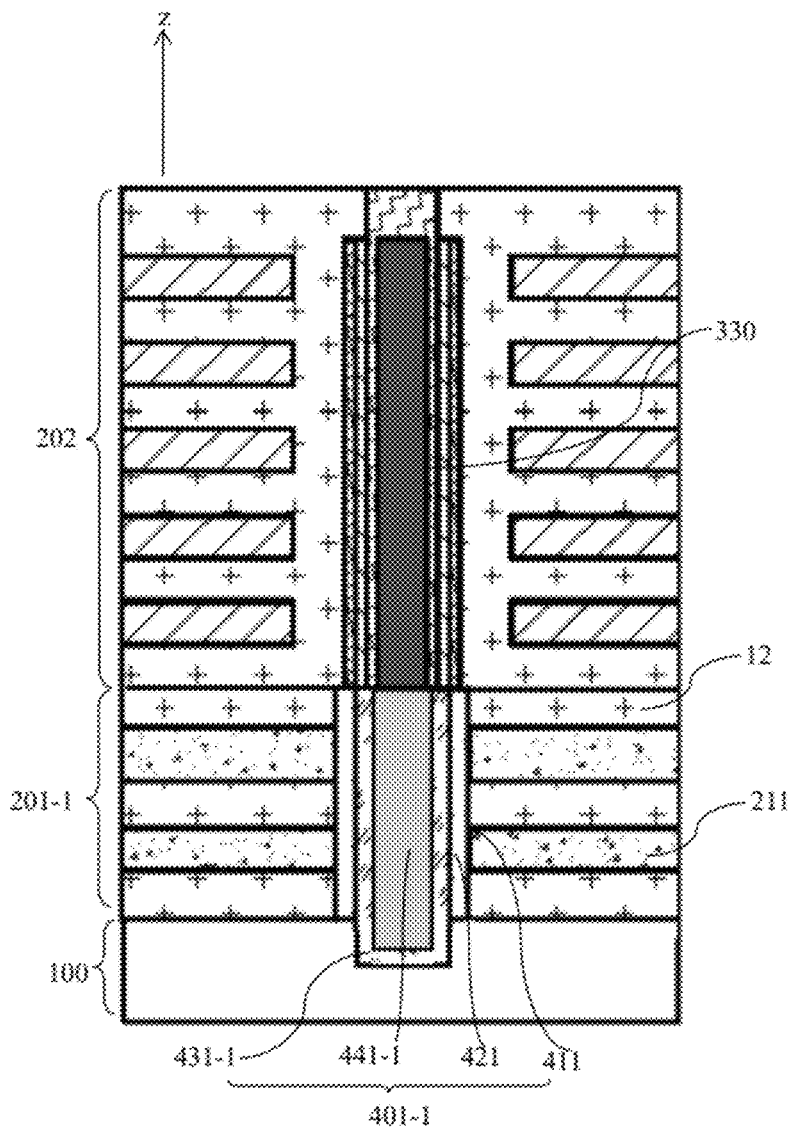
FIG. 3B is a cross-sectional view of a 3D memory according to yet another implementation of the present disclosure.

FIG. 1A is a cross-sectional view of a 3D memory 1000 according to an implementation of the present disclosure. FIG. 1B is a cross-sectional view of a 3D memory 1000 according to another implementation of the present disclosure. FIG. 2 is a cross-sectional view of a 3D memory 1000 according to yet another implementation of the present disclosure. FIG. 3A is a cross-sectional view of a 3D memory 1000 according to yet another implementation of the present disclosure. FIG. 3B is a cross-sectional view of a 3D memory 1000 according to yet another implementation of the present disclosure.

The 3D memory may include a bottom select gate structure, a stack structure, and a top select gate structure. The stack structure 202 is formed on the bottom select gate structure 201, and the top select gate structure 203 is formed on the stack structure 202, as shown in FIGS. 1A to 3B. The stack structure 202 may include a channel layer 330 extending in the stack structure 202 along a first direction (z-direction) and having a first conductive type impurity, wherein the first direction is the thickness direction of the stack structure 202. In addition, at least one of the bottom select gate structure 201 and the top select gate structure 203 may include a semiconductor structure (not shown) connected with the channel layer 330. The semiconductor structure extends in the first direction and has a second conductive type impurity opposite to the first conductive type impurity. As an option, the channel layer 330 may have an N-type impurity, and the semiconductor structure may have a P-type impurity. As another option, the channel layer 330 may have a P-type impurity, and the semiconductor structure may have an N-type impurity, which is not limited herein.

In an implementation of the present disclosure, particularly as shown in FIG. 3A, the semiconductor structure described above may be a first semiconductor fill layer 431 formed in the bottom select gate structure 201. As shown in FIGS. 1A and 2, in another implementation of the present disclosure, the semiconductor structure described above may be a second semiconductor fill layer 432 formed in the top select gate structure 203. Furthermore, in yet another implementation of the present disclosure, the semiconductor structure may also include both the first semiconductor fill layer formed in the bottom select gate structure and the second semiconductor fill layer formed in the top select gate structure.

In addition, as shown in FIG. 3B, in an implementation of the present disclosure, the semiconductor structure may be a first semiconductor thin film layer 431-1 formed in the bottom select gate structure 201-1. As shown in FIG. 1B, in another implementation of the present disclosure, the semiconductor structure may be a second semiconductor thin film layer 432-1 formed in the top select gate structure 203-1. Furthermore, in yet another implementation of the present disclosure, the semiconductor structure may also include both the first semiconductor thin film layer formed in the bottom select gate structure and the second semiconductor thin film layer formed in the top select gate structure.

The structure of each part of the 3D memory 1000 described above will be described in detail below with reference to FIGS. 1A to 3B.

As shown in FIG. 1A, in an implementation of the present disclosure, the 3D memory 1000 may include a stack structure 202 and a top select gate structure 203, wherein the top select gate structure 203 is formed on the stack structure 202. The stack structure 202 may include a channel layer 330 extending in the stack structure 202 in a first direction and having a first conductive type impurity. The top select gate structure 203 may include one second stack layer 22 and a second semiconductor fill layer 432. The second stack layer 22 may include one top select gate layer 213 and one top dielectric layer 223. The second semiconductor fill layer 432, as a semiconductor structure located in the top select gate structure 203, has a second conductive type impurity opposite to the first conductive type impurity and is connected with the channel layer 330 having the first conductive type impurity. It should be understood that the connection between the second semiconductor fill layer 432 and the channel layer 330 may include a direct connection and an indirect connection. For example, the second semiconductor fill layer 432 may be indirectly connected with the channel layer 330 by a channel plug 340 formed above the channel structure 300.

In addition, the top select gate structure 203 may also include a top isolation layer 21 disposed between the stack structure 202 and the second stack layer 22; a second barrier layer 422 disposed between the second semiconductor fill layer 432 and the second stack layer 22 in a direction approximately perpendicular to the thickness of the second stack layer 22 (which can be understood as a direction perpendicular to the first direction); and a conductive plug 500 disposed above the second semiconductor fill layer 432.

In the structure of the 3D memory, a Top Select Gate (TSG) structure with partitions is generally provided to obtain more precise control of fingers and strings of the 3D memory, and to be able to reduce the power consumption of the 3D memory and reduce the resistance-capacitance delay thereof. Further, on this basis, the 3D memory provided by the present disclosure can form a PN junction barrier capacitance in a conductive circuit connecting the channel layer by providing a second semiconductor fill layer having an impurity of the opposite conductive type to the channel layer in the top select gate structure. Therefore, the width of the space charge region in the PN junction barrier capacitance can be changed by applying a control trigger voltage to the top select gate structure, so that the turn-on/turn-off performance of the 3D memory can be optimized by controlling the turn-on speed of the channel layer through modulating the width of the space charge region described above according to the requirements of the erasing, programming and reading operation of the 3D memory.

Further, the second semiconductor fill layer 432 shown in FIG. 1A can be understood as a solid semiconductor structure (it should be understood that cavities or voids formed in the fabrication process is allowed to be inside the second semiconductor fill layer 432). The second semiconductor fill layer 432 of the solid semiconductor structure can enhance the gate controllability of the above-mentioned top select gate structure in controlling the channel layer turn-on speed. Additionally, it can also simplify the process of manufacturing the 3D memory by setting the second semiconductor fill layer 432 as a solid semiconductor structure, an effect of which will be described in detail later.

In particular, the stack structure 202 may include alternately stacked multiple gate layers 212 and multiple insulating layers 222. The gate layer 212 comprises conductive materials such as any one or combination of tungsten (W), cobalt (Co), copper (Cu), aluminum (Al), doped crystalline silicon, or silicide. The insulating layer 222 may be used as an isolation stack layer including, but not limited to, a layer of insulating dielectric material such as silicon oxide. The number of layers of the stack structure 202 is not limited to what is shown in the figure, and may be additionally provided, for example, 32 layers, 64 layers, 128 layers, and the like, as required.

Further, with the increasing demand of 3D memory storage capacity, the number of the memory stack layers is gradually increasing. The stack structure 202 may include a plurality of sub-stack structures formed using, for example, a double stack technique or a multi-stack technique. A plurality of sub-stack structures may be sequentially stacked in the direction of the thickness of the stack structures to form the stack structure 202, wherein each sub-stack structure may include a plurality of insulating layers and gate layers alternately stacked. The number of layers of each sub-stack structure may be the same or different. The contents of a single stack structure described below may be fully or partially applicable to a stack structure formed by a plurality of sub-stack structures; therefore, contents related to or similar thereto will not be repeated.

Additionally, the stack structure 202 may also include a channel structure 300. The channel structure 300 extends in the stack structure 202 in a first direction, and may include a channel hole (not shown), a functional layer 320, and a channel layer 330 that are sequentially formed on the inner walls of the channel hole. As an option, the channel hole may have a cylindrical or pillar shape through the stack structure 202. The functional layer 320 may include a block layer formed on the inner wall of the channel hole to block charge outflow, a charge trapping layer formed on the surface of the block layer to store charge during the operation of the 3D memory, and a tunneling layer formed on the surface of the charge trapping layer.

In some implementations, the functional layer 320 may include an oxide-nitride-oxide (ONO) structure. However, in some other implementations, the functional layer 320 may have a different structure than the ONO configuration. For example, the functional layer 320 may include a silicon oxide layer, a silicon nitride layer, and another silicon oxide layer.

The channel layer 330 may be formed on the surface of the tunneling layer and used to transport desired charges (electrons or holes). According to an exemplary implementation of the present disclosure, the channel layer 330 may be formed on the surface of the tunneling layer by a thin film deposition process such as chemical vapor deposition (CVD), physical vapor deposition (PVD), atomic layer deposition (ALD), or any combination thereof. The channel layer 330 may likewise extend in the stack structure 202 in the first direction. As an option, the channel layer 330, similar to the channel hole, may be also through the stack structure 202 and have a cylindrical or pillar shape. The channel layer 330 may be made from a semiconductor material such as polysilicon or monocrystalline silicon, and have the first conductive type impurity. For example, the channel layer 330 may be an N-type doped polysilicon layer.

Further, the 3D memory 1000 also includes a channel plug 340 formed above the channel layer 330, and the channel layer 330 can be connected with the second semiconductor fill layer 432 by the channel plug 340. The material of the channel plug 340 may be the same as that of the channel layer 330, for example, N-type doped polysilicon or the like. For example, the impurity doping concentration of the channel plug 340 may be greater than that of the channel layer 330. Optionally, the channel plug 340 may have an impurity doping concentration of $10^{19}$ cm$^{-3}$ to $10^{21}$ cm$^{-3}$, and the channel layer 330 may have an impurity doping concentration of $10^{13}$ cm$^{-3}$ to $10^{15}$ cm$^{-3}$. The channel plug having a relatively high impurity doping concentration may be used as source or drain of the memory string to which the channel layer belongs.

In an implementation of the present disclosure, the top select gate structure 203 may include a top isolation layer 21, a second stack layer 22, and a second composite structure 402. The second composite structure 402 may include a second vertically-extending hole 412, a second barrier layer 422, a second semiconductor fill layer 432, and a conductive plug 500.

The top isolation layer 21 may be disposed between the stack structure 202 and the second stack layer 22, the top isolation layer 21 including, but not limited to, a layer of insulating dielectric material such as a silicon oxide layer.

The second stack layer 22 may include one top select gate layer 213 and one top dielectric layer 223. As an option, the top select gate layer 213 may be a metal gate layer, which may be fabricated from, for example, any one or combination of tungsten (W), cobalt (Co), copper (Cu), and aluminum (Al). As another option, the top select gate layer 213 may also be a semiconductor gate layer which may be a doped crystalline silicon layer such as a highly doped polysilicon layer or a silicide layer, which is not limited herein.

The second vertically-extending hole 412 of the second composite structure 402 may extend in the top select gate structure 203 in a first direction, which may be understood as a direction of the thickness of the second stack layer 22. As an option, the second vertically-extending hole 412 may be through the top select gate structure 203 in the first direction. The second barrier layer 422 is formed on the inner wall of the second vertically-extending hole 412, and serves as a spacing structure between the second semiconductor fill layer 432 and the second stack layer 22 in a direction approximately perpendicular to the thickness of the second stack layer 22 (which can be understood as a direction perpendicular to the first direction). The second semiconductor fill layer 432 and the conductive plug 500 are disposed in the remaining space of the second vertically-extending hole 412 filled with the second barrier layer 422, wherein the conductive plug 500 is positioned above the second semiconductor fill layer 432.

The conductive plug 500 has a first conductive type impurity and is connected with one end of the second semiconductor fill layer 432. The second semiconductor fill layer 432 has a second conductive type impurity opposite to the first conductive type impurity. The other end of the second semiconductor fill layer 432 is connected with the channel layer 330 having the first conductive type impurity.

It can be understood that the connection between the second semiconductor fill layer 432 having a solid semiconductor structure (cavities or voids formed in the fabrication process is allowed to be inside the second semiconductor fill layer 432) and the channel layer 330 having an opposite conductive type impurity may form a PN junction barrier capacitance in a conductive circuit connecting the channel layer 330. Thus, the width of the space charge region in the PN junction barrier capacitance can be changed by applying the control trigger voltage to the top select gate structure 203, so that the turn-on/turn-off performance of the 3D memory can be optimized by controlling the turn-on speed of the channel layer 330 through modulating the width of the space charge region described above according to the requirements of erasing, programming and reading operation of the 3D memory.

Further, another implementation of the present disclosure, as shown in FIG. 1B, also provides another structure of top select gate structure 203-1, which differs from the top select gate structure 203 shown in FIG. 1A in that the semiconductor structure located in the top select gate structure 203-1 and connected with the channel layer 330 is a second semiconductor thin film layer 432-1, wherein the channel layer 330 has a first conductive type impurity, and the second semiconductor thin film layer 432-1 has a second conductive type impurity opposite to the first conductive type impurity.

Specifically, the top select gate structure 203-1 may include a second composite structure 402-1. The second composite structure 402-1 includes a second vertically-extending hole 412, a second barrier layer 422, a second semiconductor thin film layer 432-1, a second insulating dielectric fill layer 442-1, and a conductive plug 500. The second vertically-extending hole 412 extends in the top select gate structure 203-1 in the first direction. As an option, the second vertically-extending hole 412 may be through the top select gate structure 203-1 in the first direction. The second barrier layer 422 is formed on the inner wall of the second vertically-extending hole 412. The second semiconductor thin film layer 432-1 and the conductive plug 500 are formed on the surface of the second barrier layer 422. The second insulating dielectric fill layer 442-1 is formed on the surface of the second semiconductor thin film layer 432-1, wherein the conductive plug 500 is positioned above the second insulating dielectric fill layer 442-1 and the second semiconductor thin film layer 432-1.

In other words, the second semiconductor thin film layer 432-1 connected with the channel layer 330 in this implementation can be understood as a hollow semiconductor structure (the hollow portion is filled with the second insulating dielectric fill layer 442-1). Similarly, a PN junction barrier capacitance can be formed in a conductive circuit connecting the channel layer 330 on the basis of the existing 3D device architecture, by setting the second semiconductor thin film layer 432-1 as a hollow semiconductor structure and doping the second semiconductor thin film layer 432-1 so that the second semiconductor thin film layer 432-1 has an impurity of opposite conductive type to the channel layer 330. Thus, the width of the space charge region in the PN junction barrier capacitance is changed by applying the control trigger voltage to the top select gate structure 203-1. Further, it can be achieved that the turn-on/turn-off performance of the 3D memory can be optimized by controlling the turn-on speed of the channel layer through modulating the width of the space charge region described above according to the requirements of the erasing, programming, and reading operation of the 3D memory.

Also referring again to FIGS. 1A and 1B, the doping type of the conductive plug 500 located above the second semiconductor fill layer 432 (or above the second semiconductor thin film layer 432-1) and connected the second semiconductor fill layer 432 may be the same as that of the channel plug 340. For example, the conductive plug 500 may be made of the same material as the channel plug 340, such as N-type doped polysilicon or the like. The impurity doping concentration of the conductive plug 500 is substantially the same as that of the channel plug 340 and should be greater than that of the channel layer 330. For example, a gate-induced drain leakage (GIDL) erasing mechanism or the like in a data erasing process of a 3D memory can be realized by setting the conductive plug 500 as a conductive impurity of the same type as the channel layer.

As an option, the impurity doping concentrations of both the conductive plug and the channel plug may be set to be greater than that of the second semiconductor fill layer (or the second semiconductor thin film layer) on the basis of the above implementations to reduce the leakage present in the top select gate structure.

For example, an impurity doping concentration of the second semiconductor fill layer may be set from $10^{13}$ cm$^{-3}$ to $10^{15}$ cm$^{-3}$. For, example, an impurity doping concentration of the conductive plug and the channel plug may be set to $10^{19}$ cm$^{-3}$ to $10^{21}$ cm$^{-3}$.

Further, in conjunction with FIGS. 1A and 1B, the impurity doping concentration of the semiconductor gate layer 213 may be set to be greater than that of the second semiconductor fill layer 432 (or the second semiconductor thin film layer 432-1) when the top select gate layer 213 is the semiconductor gate layer. The bulk resistivity of the top select gate layer can be reduced, and the conductivity of the top select gate layer can be improved by setting the top select gate layer as having a highly doped semiconductor layer. For example, in a case where the impurity doping concentration of the second semiconductor fill layer 432 (or the second semiconductor thin film layer 432-1) is $10^{13}$ cm$^{-3}$ to $10^{15}$ cm$^{-3}$, the impurity doping concentration of the semiconductor gate layer 213 may be set to $10^{19}$ cm$^{-3}$ to $10^{21}$ cm$^3$.

As shown in FIG. 2, the top select gate structure 203 may also include a plurality of second stack layers 22 in order to reduce such as Program Disturb, reduce the leakage within the top select gate structure and maintain an effective program voltage. For example, the top select gate structure 203 may include two second stack layers 22, three second stack layers 22, or four second stack layers 22 as shown, where each second stack layer 22 may include one top select gate layer 213 and one top dielectric layer 223. As an option, the top select gate layer 213 may be a metal gate layer, which may be made from, for example, any one or combination of tungsten (W), cobalt (Co), copper (Cu), and aluminum (Al). As another option, the top select gate layer 213 may also be a semiconductor gate layer which may be a doped crystalline silicon layer such as a highly doped polysilicon layer or a silicide layer, which is not limited herein. Further, the thickness of the top select gate layer 213 and the top dielectric layer 223 in each second stack layer 22 may also be selected according to different settings of the 3D architecture of the memory, which is not limited herein.

Further, the top select gate structure 203 may also include a top isolation layer 21 disposed between the stack structure 202 and the second stack layer 22 and including, but not limited to, an insulating dielectric material layer such as a silicon oxide layer.

On the basis that the top select gate structure 203 includes a plurality of second stack layers 22, a second semiconductor fill layer 432 (or a second semiconductor thin film layer) may likewise be disposed on the top select gate structure 203. The second semiconductor fill layer 432 (or a second semiconductor thin film layer) has a second conductive type impurity and is connected with a channel layer 330 with a first conductive type impurity, wherein the first conductive type impurity is opposite to the second conductive type impurity.

Since the contents related to the 3D memory structure described above may be fully or partially applicable to the 3D memory structure described herein including a plurality of second stack layers, the contents related to or similar thereto will not be repeated. However, it will be understood by those skilled in the art that a second semiconductor fill layer (or a second semiconductor thin film layer) may be formed in a top select gate structure having only one second stack layer. Likewise, a second semiconductor fill layer (or a second semiconductor thin film layer) may also be formed in a top select gate structure including a plurality of second stack layers as a semiconductor structure connected with the channel layer and having an impurity of opposite conductive type to the channel layer. The features, principles, and technical effects of the structures are similar.

As shown in FIG. 3A, in an implementation of the present disclosure, the 3D memory 1000 may include a bottom select gate structure 201 and a stack structure 202, wherein the stack structure 202 is formed on the bottom select gate structure 201. The stack structure 202 may include a channel layer 330 extending in the stack structure 202 in a first direction and having a first conductive type impurity. The bottom select gate structure 201 may include at least one first stack layer 11 and a first semiconductor fill layer 431. Each first stack layer 11 may include one bottom select gate layer 211 and one bottom dielectric layer 221. The first semiconductor fill layer 431 serves as a semiconductor structure located in the bottom select gate structure 201 and connected with the channel layer 330 and having an impurity of opposite conductive type to the channel layer 330. It should be understood that the connection between the first semiconductor fill layer 431 and the channel layer 330 may include a direct connection and an indirect connection.

Further, the bottom select gate structure 201 may also include a bottom isolation layer 12 disposed between the stack structure 202 and the first stack layer 11. The bottom isolation layer 12 includes, but is not limited to, an insulating dielectric material layer such as a silicon oxide layer.

The Bottom Select Gate (BSG) structure is usually provided in the structure of the 3D memory to realize the turn-off and turn-on operations of the 3D memory during a data operation. Further, the bottom select gate structure of the 3D memory provided herein may include at least one first stack layer. In other words, in the 3D architecture of the memory, the 3D memory may include at least two BSGs when it is difficult for a single-layer BSG to achieve normal turn-off and turn-on operations in its data operation. All BSGs are synchronously in turn-off or turn-on state when the 3D memory is operating on data. With a plurality of BSGs, the turn-off and turn-on operations can be better realized, and the performance of erasing, programming, and reading of the 3D memory can be improved. Hereinafter, a bottom select gate structure including a first semiconductor fill layer and including a plurality of first stack layers will be described in detail, and the related contents thereof may be fully or partially applicable to a bottom select gate structure formed by one first stack layer, and therefore the related or similar contents thereof will not be repeated.

The 3D memory provided herein can form a PN junction barrier capacitance in a conductive circuit connecting the channel layer by providing a first semiconductor fill layer connected with the channel layer and having an impurity of the opposite conductive type to the channel layer in the bottom select gate structure. Therefore, the width of the space charge region in the PN junction barrier capacitance can be changed by applying a control trigger voltage to the bottom select gate structure, so that the turn-on/turn-off performance of the 3D memory can be optimized by controlling the turn-on speed of the channel layer through modulating the width of the space charge region described above according to the requirements of the erasing, programming and reading operation of the 3D memory.

Further, the first semiconductor fill layer 431 shown in FIG. 3A can be understood as a solid semiconductor structure (it should be understood that cavities or voids formed in the fill process are allowed to be inside the first semiconductor fill layer 431). The first semiconductor fill layer 431 of the solid semiconductor structure can enhance the gate controllability of the above-mentioned bottom select gate structure in controlling the channel layer turn-on speed. Additionally, it can also simplify the process of manufacturing the 3D memory by setting the first semiconductor fill layer 431 as a solid semiconductor structure, an effect of which will be described in detail later.

In particular, in an implementation of the present disclosure, the bottom select gate structure 201 may include at least one first stack layer 11, a bottom isolation layer 12, and a first composite structure 401 including a first semiconductor fill layer 431.

Each first stack layer 11 may include one bottom select gate layer 211 and one bottom dielectric layer 221. As an option, the bottom select gate layer 211 may be a metal gate layer, which may be made from, for example, any one or combination of tungsten (W), cobalt (Co), copper (Cu), and aluminum (Al). As another option, the bottom select gate layer 211 may also be a semiconductor gate layer which may be a doped crystalline silicon layer such as a highly doped polysilicon layer or a silicide layer, which is not limited herein.

The bottom isolation layer 12 may be disposed between the stack structure 202 and the first stack layer 11. The bottom isolation layer 12 includes, but not limited to, a layer of insulating dielectric material, such as a silicon oxide layer.

The first composite structure 401 includes a first semiconductor fill layer 431 and also includes a first vertically-extending hole 411 and a first barrier layer 421. The first barrier layer 421 is formed on the inner wall of the first vertically-extending hole 411 and serves as a spacing structure between the first semiconductor fill layer 431 and the first stack layer 11 in a direction approximately perpendicular to the thickness of the first stack layer 11 (which can be understood as a direction perpendicular to the first direction). The first semiconductor fill layer 431 is filled in the remaining space of the first vertically-extending hole 411. The first semiconductor fill layer 431 has a second conductive type impurity opposite to the first conductive type impurity and is connected with the channel layer 330 having the first conductive type impurity.

The first vertically-extending hole 411 may extend in the bottom select gate structure 201 in a first direction. Furthermore, the bottom select gate structure 201 may be formed on a substrate (not shown) during the fabrication process. As an option, the first vertically-extending hole 411 may be through the bottom select gate structure 201 and extend into the substrate, so that the first semiconductor fill layer 431 may protrude from the bottom surface of the bottom select gate structure 201 (away from the surface of the stack structure 202) to facilitate good electrical contact with the semiconductor connect layer 100.

Further, another implementation of the present disclosure, as shown in FIG. 3B, also provides another structure of bottom select gate structure 201-1, which is different from the bottom select gate structure 201 shown in FIG. 3A in that the semiconductor structure located in the bottom select gate structure 201 and connected with the channel layer 330 is a first semiconductor thin film layer 431-1. The channel layer 330 has a first conductive type impurity. The first semiconductor thin film layer 431-1 has a second conductive type impurity opposite to the first conductive type impurity.

Specifically, the bottom select gate structure 201-1 may include a first composite structure 401-1. The first composite structure 401-1 may include a first semiconductor thin film layer 431-1, a first vertically-extending hole 411, a first barrier layer 421, and a first insulating dielectric fill layer 441-1. The first vertically-extending hole 411 extends in the bottom select gate structure 201-1 in a first direction, which can be understood as a direction of the thickness of the first stack layer 11. The first barrier layer 421-1 and the first semiconductor thin film layer 431-1 are sequentially formed on the inner wall of the first vertically-extending hole 411. The first insulating dielectric fill layer 441-1 is filled in the remaining space of the first vertically-extending hole 411, wherein the first semiconductor thin film layer 431-1 has a second conductive type impurity.

In other words, the first semiconductor thin film layer 431-1 connected with the channel layer 330 in this implementation can be understood as a hollow semiconductor structure (the hollow portion is filled with the first insulating dielectric fill layer 441-1). Similarly, a PN junction barrier capacitance can be formed in a conductive circuit connecting the channel layer 330 on the basis of the existing 3D device architecture, by setting the first semiconductor thin film layer 431-1 as a hollow semiconductor structure and doping the first semiconductor thin film layer 431-1 so that the first semiconductor thin film layer 431-1 has an impurity of opposite conductive type to the channel layer 330. Thus, the width of the space charge region in the PN junction barrier capacitance is changed by applying a control trigger voltage to the bottom select gate structure 201-1. Further, it can be achieved that the turn-on/turn-off performance of the 3D memory can be optimized by controlling the turn-on speed of the channel layer through modulating the width of the space charge region described above according to the requirements of the erasing, programming, and reading operation of the 3D memory.

Referring again to FIGS. 3A and 3B, the stack structure 202 may be located on the bottom select gate structure 201 (or the bottom select gate structure 201-1). In the case that the bottom select gate structure 201 (or the bottom select gate structure 201-1) includes the bottom isolation layer 12, the stack structure 202 may be formed on the bottom isolation layer 12. The stack structure 202 includes alternately stacked a plurality of gate layers 212 and a plurality of insulating layer 222. The gate layer 212 comprises conductive material, such as any one or combination of tungsten (W), cobalt (Co), copper (Cu), aluminum (Al), doped crystalline silicon, or silicide. The insulating layer 222 may be used as an isolation stack layer including, but not limited to, a layer of insulating dielectric material such as a silicon oxide layer. The number of layers of the stack structure 202 is not limited to that shown in the figure, and may be additionally provided, for example, 32 layers, 64 layers, 128 layers, and the like, as required.

Further, with the increasing demand for 3D memory storage capacity, the number of the memory stack layer is gradually increasing. The stack structure 202 may include a plurality of sub-stack structures formed using, for example, a double stack technique or a multi-stack technique. A plurality of sub-stack structures may be sequentially stacked in the direction of the thickness of the stack structures to form the stack structure 202, wherein each sub-stack structure may include a plurality of insulating layers and gate layers alternately stacked. The number of layers of each sub-stack structure may be the same or different. The contents of a single stack structure described in the context may be fully or partially applicable to a stack structure formed by a plurality of sub-stack structures; therefore, contents related to or similar thereto will not be repeated.

The stack structure 202 may include a channel structure 300. The channel structure 300 may include a channel hole (not shown) extending in the stack structure 202 in a thickness direction of the stack structure 202, and a functional layer 320 and a channel layer 330 that are sequentially formed on the inner walls of the channel hole. As an option, the channel hole may have a cylindrical or pillar shape through the stack structure 202. The functional layer 320 may include a block layer formed on the inner wall of the channel hole to block charge outflow, a charge trapping layer formed on the surface of the block layer to store charge during the operation of the 3D memory, and a tunneling layer formed on the surface of the charge trapping layer.

In some implementations, the functional layer 320 may include an oxide-nitride-oxide (ONO) structure. However, in some other implementations, the functional layer 320 may have a different structure than the ONO configuration. For example, the functional layer 320 may include a silicon oxide layer, a silicon nitride layer, and another silicon oxide layer.

The channel layer 330 may be formed on the surface of the tunneling layer and used to transport desired charges (electrons or holes). According to an exemplary implementation of the present disclosure, the channel layer 330 may be formed on the surface of the tunneling layer by a thin film deposition process such as chemical vapor deposition (CVD), physical vapor deposition (PVD), atomic layer deposition (ALD), or any combination thereof. The channel layer 330 may likewise extend in the stack structure 202 in the thickness direction of the stack structure 202. As an option, the channel layer 330, similar to the channel hole, is also through the stack structure 202 and has a cylindrical or pillar shape. The channel layer 330 may be made from a semiconductor material such as polysilicon or monocrystalline silicon, and have the first conductive type impurity. For example, the channel layer 330 may be an N-type doped polysilicon layer.

Further, the 3D memory 1000 also includes a semiconductor connect layer 100 formed below and connected with the first semiconductor fill layer 431 (or the first semiconductor thin film layer 431-1). The semiconductor connect layer 100 may be made of the same material as the channel layer 330, for example, N-type doped polysilicon or the like. In other words, the semiconductor connect layer 100, and the channel layer 330 may each have the first conductive type impurity. For example, a gate-induced drain leakage (GIDL) erasing mechanism or the like in a data erasing process of a 3D memory can be realized by setting the semiconductor connect layer 100 as the same type conductive impurity as the channel layer. Further, the impurity doping concentration of the semiconductor connect layer 100 should be greater than that of the channel layer 330.

As an option, the impurity doping concentration of the semiconductor connect layer 100 may also be set to be greater than that of the first semiconductor fill layer 431 (or the first semiconductor thin film layer 431-1) on the basis of the above-described implementation, thereby reducing the leakage present in the bottom select gate structure. For example, the impurity doping concentration of the first semiconductor fill layer (or the first semiconductor thin film layer) may be set from $10^{13}$ cm$^{-3}$ to $10^{15}$ cm$^{-3}$. The impurity doping concentration of the semiconductor connect layer may be set from $10^{19}$ cm$^{-3}$ to $10^{21}$ cm$^{-3}$.

Further, when the bottom select gate layer 211 is a semiconductor gate layer, the impurity doping concentration of the semiconductor gate layer 211 may be set to be greater than that of the first semiconductor fill layer 431 (or the first semiconductor thin film layer 431-1). The bulk resistivity of the bottom select gate layer can be reduced, and the conductivity can be improved by setting the bottom select gate layer as having a highly doped semiconductor layer. For example, in a case where the impurity doping concentration of the first semiconductor fill layer 431 (or the first semiconductor thin film layer 431-1) is $10^{13}$ cm$^{-3}$ to $10^{11}$ cm$^{-3}$, the impurity doping concentration of the semiconductor gate layer 211 may be set to $10^{19}$ cm$^{-3}$ to $10^{21}$ cm$^{-3}$.

In some implementations, a semiconductor structure (a first semiconductor fill layer, a second semiconductor fill layer, a first semiconductor thin film layer, or a second semiconductor thin film layer) connected with a channel layer can be simultaneously provided in the top and bottom select gate structures according to different settings of the 3D architecture of the memory. The channel layer has a first conductive type impurity, and the semiconductor structure has a second conductive type impurity opposite to the first conductive type impurity. For example, the first semiconductor fill layer and the second semiconductor fill layer are provided simultaneously in the bottom select gate structure and the top select gate structure.

As an option, the channel layer may have N-type impurities, and the semiconductor structure may have P-type impurities. As another option, the channel layer may have a P-type impurity, and the semiconductor structure may have an N-type impurity, which is not limited herein.

Since the contents related to the 3D memory structure described above may be fully or partially applicable to the 3D memory structure including two semiconductor structures described herein, the contents related to or similar thereto will not be repeated.

The 3D memory provided in the present disclosure can form a PN junction barrier capacitance in a conductive circuit connecting the channel layer by providing a semiconductor structure (a first semiconductor fill layer, a second semiconductor fill layer, a first semiconductor thin film layer, or a second semiconductor thin film layer) connected with the channel layer and having an impurity of the opposite conductive type to the channel layer in the select gate structure (at least one of the bottom select gate structure and the top select gate structure). Therefore, the width of the space charge region in the PN junction barrier capacitance can be changed by applying a control trigger voltage to the select gate structure, so that the turn-on/turn-off performance of the 3D memory can be optimized by controlling the turn-on speed of the channel layer through modulating the width of the space charge region above-described according to the requirements of the erasing, programming and reading operation of the 3D memory.

FIG. 4 is a flowchart of a manufacturing method 2000 of a 3D memory according to an implementation of the present disclosure. FIGS. 5A to 5G are respectively process diagrams of a manufacturing method 2000 of a 3D memory according to an implementation of the present disclosure.

As shown in FIG. 4, the manufacturing method 2000 includes the following steps:

S11. Forming a bottom select gate structure on a substrate, wherein the bottom select gate structure includes a semiconductor structure having a second conductive type impurity.

S12. Forming an initial stack structure on the bottom select gate structure.

S13. Forming a channel layer extending in the initial stack structure in a thickness direction of the initial stack structure, wherein the channel layer has a first conductive type impurity opposite to the second conductive type impurity and is connected with the semiconductor structure in the bottom select gate structure.

Specific processes of each step of the above-described manufacturing method 2000 will be described in detail below with reference to FIGS. 5A to 5G.

Figure 5A:
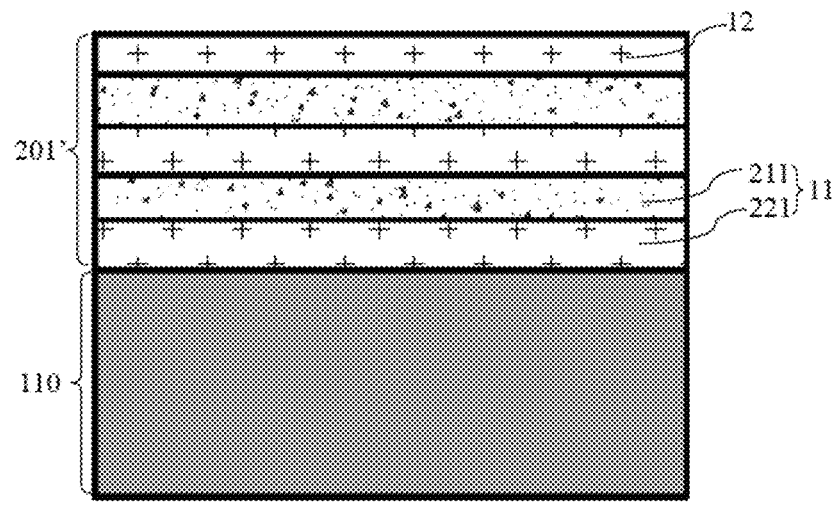
FIGS. 5A to 5G are respectively process diagrams of a manufacturing method of a 3D memory according to an implementation of the present disclosure.
Figure 5B:
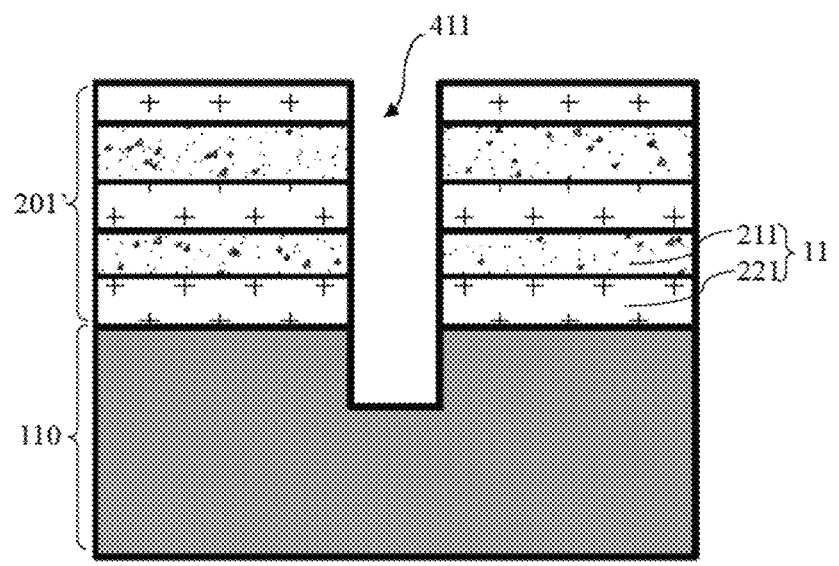
Figure 5C:
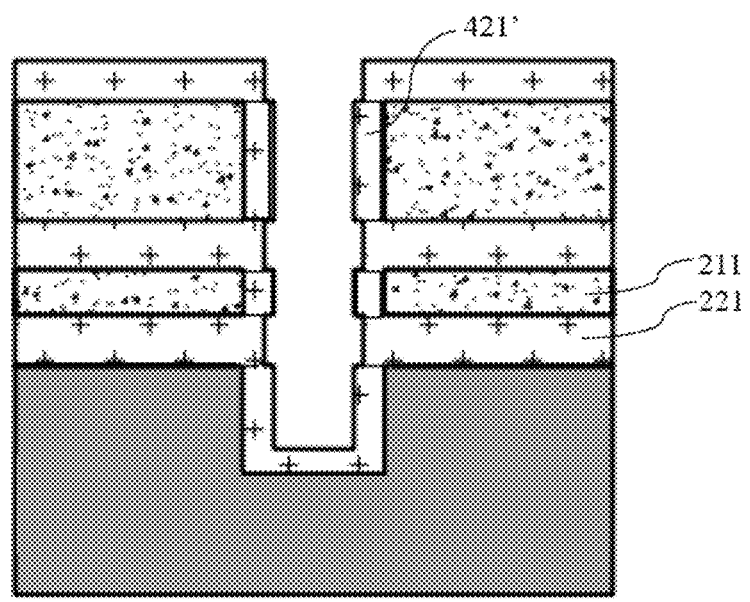
Figure 5D:
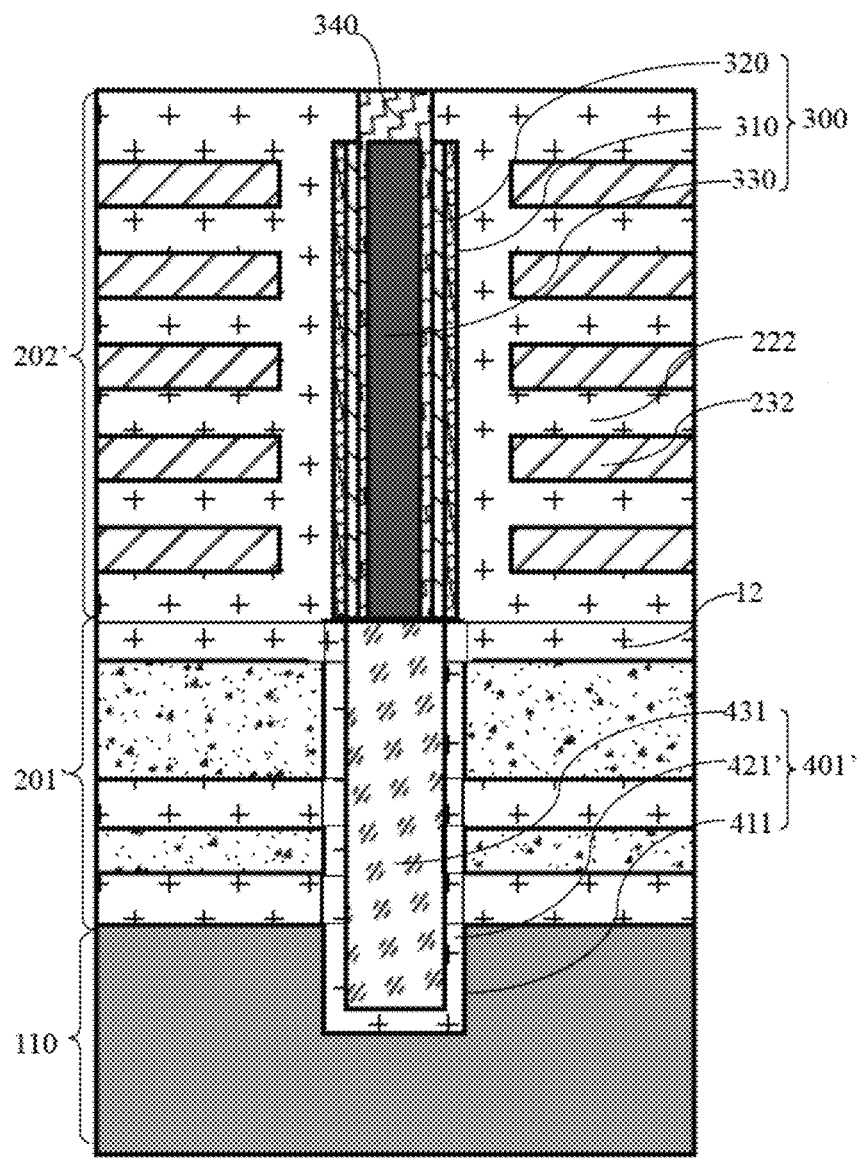

FIG. 5A is a schematic cross-sectional view of a structure formed after the initial bottom select gate structure 201' is formed according to an implementation of the present disclosure. FIG. 5B is a schematic cross-sectional view of a structure formed after the first vertically-extending hole 411 is formed in the initial bottom select gate structure 201' according to an implementation of the present disclosure. FIG. 5C is a schematic cross-sectional view of a 3D memory after the initial first barrier layer 421' is formed on the inner wall of the first vertically-extending hole 411 according to an implementation of the present disclosure. FIG. 5D is a schematic cross-sectional view of a structure formed after the initial stack structure 202' is formed according to an implementation of the present disclosure.

As an option, in an implementation of the present disclosure, as shown in FIG. 5A to 5D, S11: forming a bottom select gate structure on a substrate, wherein the bottom select gate structure includes a first semiconductor fill layer having a second conductive type impurity, S11 may include, for example: providing a substrate 110; forming an initial bottom select gate structure 201' on a substrate 110; forming a first semiconductor fill layer 431 in the initial bottom select gate structure 201', wherein the first semiconductor fill layer 431 is a semiconductor structure having a second conductive type impurity in the bottom select gate structure 201.

Particularly, in an implementation of the present disclosure, the manufacturing material of the substrate 110 may be selected from any suitable semiconductor material, for example, monocrystalline silicon (Si), monocrystalline germanium (Ge), silicon germanium (GeSi), silicon carbide (SiC), silicon on insulator (SOI), germanium on insulator (GOI) or gallium arsenide and other compounds in Group III-V. For example, the substrate 110 may be monocrystalline silicon.

In an implementation of the present disclosure, the substrate 110 may be, for example, a composite substrate for supporting a device structure thereon. A plurality of layers made of different materials may be sequentially disposed to form the substrate 110 by a thin film deposition process such as chemical vapor deposition (CVD), physical vapor deposition (PVD), atomic layer deposition (ALD), or any combination thereof.

The substrate 110 may include a substrate sacrificial layer for subsequent formation of the semiconductor connect layer. The substrate sacrificial layer may include a single layer, a plurality of layers, or a suitable composite layer. For example, the substrate sacrificial layer may include any one or more of a silicon oxide layer, a silicon nitride layer, and a silicon oxynitride layer. As an option, the substrate sacrificial layer may be a high dielectric constant dielectric layer. As another option, the substrate sacrificial layer may include a dielectric layer, a sacrificial layer, and a dielectric layer provided in sequence, wherein the dielectric layer may be a silicon nitride layer, and the sacrificial layer may be a silicon oxide layer. As another option, the substrate sacrificial layer may include any one or more of a dielectric material, a semiconductor material, and a conductive material. For example, the sacrificial layer may be monocrystalline silicon or polysilicon. Specifically, an exemplary material forming the sacrificial layer in an implementation of the present disclosure may be polysilicon.

Partial regions of the substrate 110 may also form well regions doped by an N-type or P-type dopant via an ion implantation or diffusion process. The dopant may include any one or combination of phosphorus (P), arsenic (As), and antimony (Sb). In some implementations of the present disclosure, the well regions may be made with the same dopant or different dopants. Further, the doping concentration of the well regions may be the same or different, and this is not limited by the present disclosure.

The initial bottom select gate structure 201' may be formed on the substrate 110 by one or more thin film deposition processes after the substrate 110 is formed. The thin film deposition process may include, but is not limited to, chemical vapor deposition (CVD), physical vapor deposition (PVD), atomic layer deposition (ALD), or any combined thin film deposition process thereof or any combination thereof, which is not limited herein. The initial bottom select gate structure 201' may include at least one first stack layer 11. As an option, the bottom select gate structure 201 may also include at least two first stack layers 11. Each first stack layer 11 may include one bottom select gate layer 211 and one bottom dielectric layer 221.

It should be understood by those in the art that the initial bottom select gate structure (which may also be understood as a subsequently formed bottom select gate structure) may include only one first stack layer or may include a plurality of first stack layers without departing from the technical schemes claimed herein. In other words, the composition, the structure, and the generation process of the bottom select gate structure can be changed to obtain the various results and advantages described in this specification. Since the contents and structures involved in the manufacturing process of the 3D memory including the first semiconductor structure described below may be fully or partially applicable to the above-mentioned 3D memory having the initial bottom select gate structure with a different number of layers, the manufacturing method of the 3D memory including a plurality of first stack layers may be described in details below, and the contents related to or similar to the manufacturing method of the 3D memory including only one first stack layer will not be repeated.

As an option, the bottom select gate layer 211 may be made from a metal material which may be, for example, any one or combination of tungsten (W), cobalt (Co), copper (Cu), and aluminum (Al). As another option, the bottom select gate layer 211 may be a semiconductor gate layer which may be a doped crystalline silicon layer such as a highly doped polysilicon layer or a silicide layer, which is not limited herein. The bottom dielectric layer 221 may be made from a dielectric material. Exemplary materials for forming bottom dielectric layer 221 may include silicon oxide.

In an implementation of the present disclosure, the semiconductor gate layer above described may be formed using an in-situ doping process. The semiconductor gate layer can be highly doped in the deposition process by an in-situ doping process. When the impurity doping concentration of the semiconductor gate layer is greater than that of the first semiconductor fill layer (or the first semiconductor thin film layer) formed subsequently, the bulk resistivity of the bottom select gate layer can be reduced, and conductivity of the bottom select gate layer can be improved. For example, in a case where the impurity doping concentration of the first semiconductor fill layer (or the first semiconductor thin film layer) is $10^{13}$ cm$^{-3}$ to $10^{15}$ cm$^{-3}$, the impurity doping concentration of the semiconductor gate layer may be set to $10^{19}$ cm$^{-3}$ to $10^{21}$ cm$^{-3}$.

Further, the initial bottom select gate structure 201' also includes a bottom isolation layer 12 located on a side away from the substrate 110. The bottom isolation layer 12 may be formed using one or more thin film deposition processes. The thin film deposition process may include, but is not limited to, chemical vapor deposition (CVD), physical vapor deposition (PVD), atomic layer deposition (ALD), or any combined thin film deposition process thereof, or any combination thereof, which is not limited herein. As an option, the bottom isolation layer 12 may be formed simultaneously with the first stack layer 11. The bottom isolation layer 12 may be disposed between the first stack layer 11 and the stack structure formed. Subsequently, the bottom isolation layer includes, but not limited to, an insulating dielectric material layer, such as a silicon oxide layer.

As shown in FIGS. 5B to 5D, in an implementation of the present disclosure, an initial first composite structure 401' may be formed in the initial bottom select gate structure 201' after forming the initial bottom select gate structure 201', wherein the initial first composite structure 401' includes a first semiconductor fill layer 431. Specifically, forming the initial first composite structure 401' may include, for example: forming a first vertically-extending hole 411; forming an initial first barrier layer 421' on the inner wall of the first vertically-extending hole 411; filling the remaining portion of the first vertically-extending hole 411 completely with a semiconductor fill material having a second conductive type impurity to form a first semiconductor fill layer 431.

In particular, as shown in FIG. 5B, the first vertically-extending hole 411 may be formed by, for example, a dry etching process or a combination of dry and wet etching processes. Further, other manufacturing processes, such as a patterning process including photolithography, cleaning, and chemical mechanical polishing may be performed as well to form the first vertically-extending hole 411. The first vertically-extending hole 411 extends in the initial bottom select gate structure 201' in the thickness direction of the first stack layer 11. As an option, the first vertically-extending hole 411 may have a cylindrical or pillar shape that is through the bottom select gate structure 201 and extends to the substrate 110.

An initial first barrier layer 421' may be formed on the inner walls (sidewall and bottom surface) of the first vertically-extending hole 411 by a process such as chemical vapor deposition (CVD), physical vapor deposition (PVD), atomic layer deposition (ALD) or any combined thin film deposition process thereof, or any combination thereof after the formation of the first vertically-extending hole 411. Or, as shown in FIG. 5C, when the bottom select gate layer 211 is a semiconductor gate layer, an oxide layer is formed on the inner wall (side wall and bottom surface) of the first vertically-extending hole 411 as an initial first barrier layer 421' by an oxidation process.

As shown in FIG. 5D, as an option, the first semiconductor fill layer 431 may be formed by completely filling the remaining portion of the first vertically-extending hole 411 with a semiconductor fill material with a second conductive type impurity by, for example, an in-situ doping process after the initial first barrier layer 421' is formed. It should be understood that the cavities or voids formed during the above-mentioned filling process are allowed to exist inside the first semiconductor fill layer 431. Moreover, the second conductive type impurity may be a P-type impurity or an N-type impurity, which is not limited herein.

The initial first composite structure 401' includes the first vertically-extending hole 411, the initial first barrier layer 421', and the first semiconductor fill layer 431, which are sequentially formed as described above. The first composite structure 401 may be formed by removing a portion of the initial first barrier layer 421' located in the substrate 110 during the subsequent formation of a semiconductor connect layer connected with the first semiconductor fill layer 431 (see FIG. 3A).

For example, as an option, the range of impurity doping concentration of the first semiconductor fill layer 431 may be $10^{13}$ cm$^{-3}$ to $10^{15}$ cm$^{-3}$.

A PN junction barrier capacitance may be formed in a conductive circuit connecting the channel layer by providing a first semiconductor fill layer connected with the subsequently-formed channel layer and having an impurity of the opposite conductive type to the channel layer in the bottom select gate structure. Therefore, the width of the space charge region in the PN junction barrier capacitance can be changed by applying a control trigger voltage to the bottom select gate structure, so that the turn-on/turn-off performance of the 3D memory can be optimized by controlling the turn-on speed of the channel layer through modulating the width of the space charge region above described according to the requirements of the erasing, programming and reading operation of the 3D memory.

Further, it can be understood that the first semiconductor fill layer formed in the above manner is a solid semiconductor structure. The solid semiconductor structure can enhance the gate controllability of the bottom select gate structure in controlling the turn-on speed of channel layer while simplifying the manufacturing process of the 3D memory. Particularly, in this implementation, only a one-step filling process is used to fill up the remaining space in the vertically-extending hole except the initial first barrier layer to form a first semiconductor fill layer. Therefore, there is no need to use an additional process again, such as a filling process for forming an insulating dielectric fill layer in the vertically-extending hole, etc., which simplifies the manufacturing process of the 3D memory.

Further, referring to FIG. 3B, as another option, in another implementation of the present disclosure, the first semiconductor thin film layer 431-1 is a semiconductor structure having a second conductive type impurity in the bottom select gate structure 201-1. Specifically, the first semiconductor thin film layer 431-1 may be formed on the surface of the initial first barrier layer by, for example, an in-situ doping process after the initial first barrier layer (not shown) is formed on the inner walls of the first vertically-extending hole 411. The first insulating dielectric fill layer 441-1 may be formed in the remaining portion of the first vertically-extending hole 411 using a process such as chemical vapor deposition (CVD), physical vapor deposition (PVD), atomic layer deposition (ALD), or any combined thin film deposition process thereof, or any combination thereof. It can be understood that the first semiconductor thin film layer formed by this implementation is a hollow semiconductor structure (the hollow portion is filled with an insulating dielectric fill layer). In particular, the first semiconductor thin film layer may be doped using an in-situ doping process when the first semiconductor thin film layer is formed by a deposition process, so that the first semiconductor thin film layer has an impurity of opposite conductive type to a channel layer subsequently formed and connected with the first semiconductor thin film layer.

Likewise, the first semiconductor thin film layer having a hollow semiconductor structure can be formed on the basis of the existing 3D device architecture, and then the channel layer connected with the first semiconductor thin film layer can be continuously formed. Since the conductive types of the first semiconductor thin film layer and the channel layer are opposite, the PN junction barrier capacitance can be formed in the conductive circuit connecting the channel layer. Therefore, the width of the space charge region in the PN junction barrier capacitance is changed by applying a control trigger voltage to the bottom select gate structure. In turn, it can be achieved that the turn-on/turn-off performance of the 3D memory is optimized by controlling the turn-on speed of the channel layer through modulating the width of the space charge above described region according to the requirements of the erasing, programming, and reading operation of the 3D memory.

As an option, the range of the impurity doping concentration of the first semiconductor thin film layer may be $10^{13}$ cm$^{-3}$ to $10_{15}$ cm$^{-3}$.

Referring again to FIG. 5D, step S12 forming an initial stack structure on the bottom select gate structure may include: forming an initial stack structure 202' on a side of the initial bottom select gate structure 201' away from the substrate 110 by a thin film deposition process such as chemical vapor deposition (CVD), physical vapor deposition (PVD), atomic layer deposition (ALD), or any combination thereof.

Likewise, as an option, an initial stack structure 202' may be formed on the bottom isolation layer 12 in the case where the initial bottom select gate structure 201' includes the bottom isolation layer 12.

After the first semiconductor fill layer 431 is formed, an initial stack structure 202' may be formed on a side of the bottom select gate structure 201 away from the substrate 110.

The initial stack structure 202' may include a plurality of pairs of insulating layers 222 and gate sacrificial layers 232 alternately stacked on each other. For example, the initial stack structure 202' may include 64 pairs, 128 pairs, or more than 128 pairs of insulating layers 222 and gate sacrificial layers 232.

In some implementations, the insulating layer 222 and the gate sacrificial layer 232 may include a first dielectric material and a second dielectric material different from the first dielectric material, respectively. Exemplary materials used to form the insulating layer 222 and the gate sacrificial layer 232 may include silicon oxide and silicon nitride, respectively. The silicon oxide layer may be used as the isolation stack layer, and the silicon nitride layer may be used as the sacrificial stack layer. The sacrificial stack layer may then be etched away and replaced with a conductor layer comprising a conductive material.

The manufacturing method of a single stack structure is described above. In fact, with the increasing demand for 3D memory storage capacity, the memory stack layer is gradually increasing. In order to break through the limitations of the process limits, a plurality of sub-stack structures may be sequentially stacked in the thickness direction of the stack structures by using a double stack technique or a multi-stack technique to form the stack structure, wherein each sub-stack structure may include a plurality of insulating layers and gate sacrificial layers alternately stacked. The number of layers of each sub-stack structure may be the same or different. The contents and structures involved in the process of manufacturing a single stack structure described above may be fully or partially applicable to a stack structure formed by a plurality of sub-stack structures described herein; therefore, contents related to or similar thereto will not be repeated. However, it will be understood by those skilled in the art that subsequent fabrication processes may be performed on the basis of a multi-stack structure or a single stack structure.

Referring again to FIG. 5D, step S13: forming a channel layer extending in the initial stack structure in the thickness direction of the initial stack structure, wherein the channel layer has a first conductive type impurity and is connected with the semiconductor structure in the bottom select gate structure, the step S13 may include, for example: forming a channel hole 310 extending in the initial stack structure 202' in the thickness direction of the initial stack structure 202'; forming a functional layer 320 and a channel layer 330 connected with the first semiconductor fill layer 431 sequentially on the inner walls of the channel hole 310; and forming a channel plug 340 above the channel layer 330.

The channel hole 310 may be formed by, for example, a dry etching process or a combination of dry and wet etching processes. Other manufacturing processes, such as patterning processes including photolithography, cleaning, and chemical mechanical polishing, may also be performed. As an option, the channel hole 310 may have a cylindrical or pillar shape through the initial stack structure 202'.

The functional layer 320 may include a block layer formed on the inner walls of the channel hole 310 to block charge outflow, a charge trapping layer formed on the surface of the block layer to store charge during the operation of the 3D memory, and a tunneling layer formed on the surface of the charge trapping layer. The functional layer 320 may be formed on the inner walls of the channel hole 310 by a thin film deposition process such as chemical vapor deposition (CVD), physical vapor deposition (PVD), atomic layer deposition (ALD), or any combination thereof.

In some implementations, the functional layer 320 may include an oxide-nitride-oxide (ONO) structure. However, in some other implementations, the functional layer 320 may have a different structure than the ONO configuration. For example, the functional layer 320 may include a silicon oxide layer, a silicon nitride layer, and another silicon oxide layer.

The channel layer 330 can be used to transport desired charges (electrons or holes). According to an exemplary implementation of the present disclosure, the channel layer 330 may be formed on the surface of the tunneling layer by a thin film deposition process such as chemical vapor deposition (CVD), physical vapor deposition (PVD), atomic layer deposition (ALD), or any combination thereof.

In some implementations, the channel layer 330 may comprise silicon, such as polysilicon or monocrystalline silicon. The channel layer 330 has the first conductive type impurity. The first conductive type impurity and the second conductive type impurity may be a P-type impurity or an N-type impurity, which is not limited herein. For example, the material forming the channel layer 330 may include, but is not limited to, N-type doped polysilicon. The channel layer 330 may extend in the initial stack structure 202' in the thickness direction of the initial stack structure 202' and be connected with the first semiconductor fill layer 431 (or the first semiconductor thin film layer 431-1 as shown in FIG. 3B). As an option, a channel layer 330, similar to the channel hole 310, may be also through the initial stack structure 202' and be connected with the first semiconductor fill layer 431 (or the first semiconductor thin film layer 431-1).

The functional layer 320 and the channel layer 330 located on the inner walls of the channel hole 310 form a channel structure 300.

Further, the 3D memory further includes a channel plug 340 formed at the top of the channel hole away from the substrate 110. In other words, the channel plug 340 may be formed above the channel layer 330. The channel plug 340 may be manufactured using the same material as the channel layer 330, such as N-type doped polysilicon or the like. Further, the doping concentration of the conductive impurity of the channel plug 340 should be higher than that the channel layer 330.

Figure 5E:
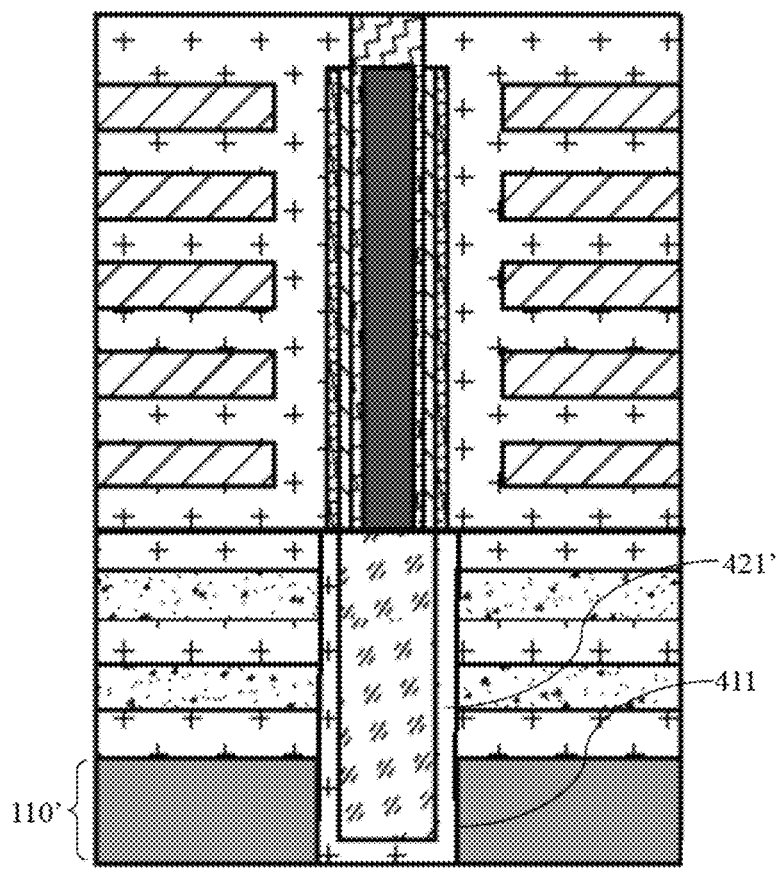
Figure 5F:
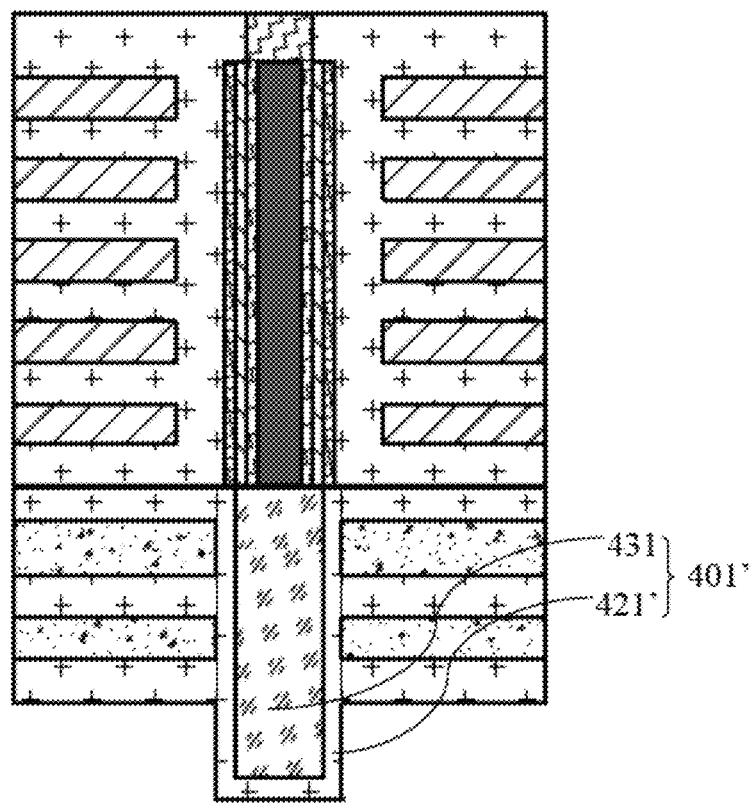
Figure 5G:
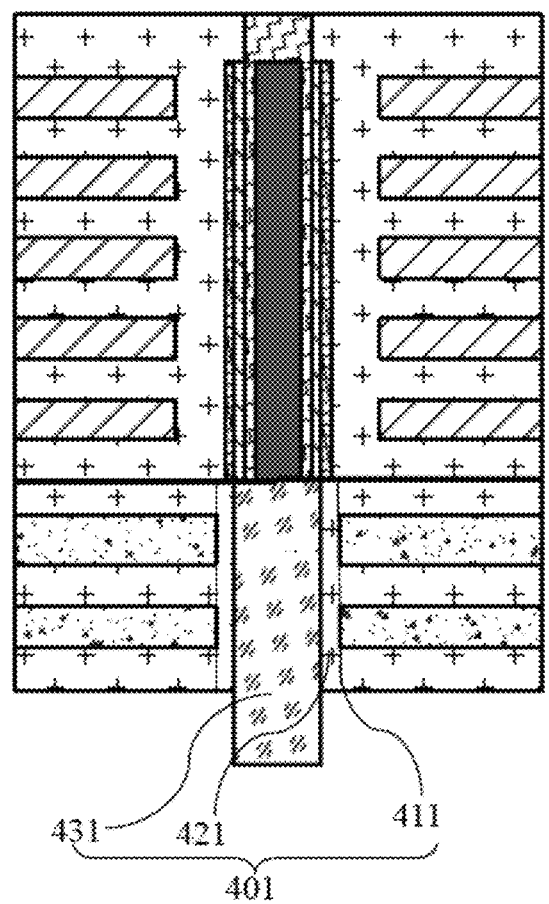

FIG. 5E is a schematic cross-sectional view of a 3D memory after thinning (e.g., removing) the substrate 110 according to an implementation of the present disclosure. FIG. 5F is a schematic cross-sectional view of a 3D memory after exposing a portion of the initial first barrier layer 421' in the substrate 110 according to an implementation of the present disclosure. FIG. 5G is a schematic cross-sectional view of a 3D memory after the first barrier layer 421 is formed according to an implementation of the present disclosure.

Further, as shown in FIGS. 3A, 3B, 5E to 5G, the manufacturing method 2000 of the 3D memory provided by the present disclosure further includes forming a semiconductor connect layer 100. In particular, the way of forming the semiconductor connect layer 100 in an implementation of the present disclosure may include, for example: removing at least a portion of the substrate 110 after the first semiconductor fill layer 431 (or the first semiconductor thin film layer 431-1) is formed to expose a portion of the initial first barrier layer 421' located on the substrate 110; and forming a semiconductor connect layer 100 connected with the first semiconductor fill layer 431 (or the first semiconductor thin film layer 431-1), wherein the semiconductor connect layer 100 has the first conductive type impurity. The first semiconductor fill layer 431 (or the first semiconductor thin film layer 431-1) has the second conductive type impurity.

As shown in FIG. 5E, the substrate 110 may be thinned (it can be understood that the portion of the substrate 110 is removed as shown in FIG. 5D) by, for example, a dry etching process or a combination of dry and wet etching processes, or other manufacturing processes such as a patterning process including photolithographic, cleaning and/or chemical mechanical polishing (CMP) may also be performed, until a portion of the initial first barrier layer 421' located at the bottom of the first vertically-extending hole 411 is exposed.

Continuing the above process as shown in FIG. 5F, at least a portion of the thinned substrate 110' (as shown in FIG. 5E) is removed to expose a portion of the initial first barrier layer 421' located on the substrate 110 (as shown in FIG. 5D).

In conjunction with FIGS. 3A, 3B, and 5G, in an implementation of the present disclosure, the exposed initial first barrier layer 421' may be removed by, for example, a dry etching process or a combination of dry and wet etching processes to form the first barrier layer 421 and the first composite structure 401 including the first barrier layer 421 after exposing a portion of the initial first composite structure 401' located on the substrate 110. After the exposed initial first barrier layer 421' is removed, the first semiconductor fill layer 431 (or the first semiconductor thin film layer 431-1) originally wrapped therein is exposed so as to facilitate connection with the subsequently formed semiconductor connect layer 100.

The semiconductor connect layer 100 may be formed on the surface of the exposed first semiconductor thin film layer 431-1 (or the surface of the exposed first semiconductor fill layer 431) by a thin film deposition process such as chemical vapor deposition (CVD), physical vapor deposition (PVD), atomic layer deposition (ALD) or any combination thereof. As an option, the semiconductor connect layer 100 may be formed by an in-situ doping process, in which the semiconductor connect layer 100 is doped while being formed by a deposition process, so that it has the same conductive type impurity as the channel layer 330 and the doping concentration is higher than that of the channel layer 330.

For example, a gate-induced drain leakage (GIDL) erasing mechanism or the like in a data erasing process of a 3D memory can be realized by setting the semiconductor connect layer 100 as the same conductive type impurity as the channel layer 330.

Further, the impurity doping concentration of the semiconductor connect layer 100 may be set to be greater than that of the first semiconductor fill layer 431 (or the first semiconductor thin film layer 431-1) to reduce leakage present in the bottom select gate structure. For example, the impurity doping concentration of the first semiconductor fill layer 431 (or the first semiconductor thin film layer 431-1) may be set to $10^{13}$ cm$^{-3}$ to $10^{15}$ cm$^{-3}$. The impurity doping concentration of the semiconductor connect layer 100 may be set to $10^{19}$ cm$^{-3}$ to $10^{21}$ cm$^{-3}$.

Further, as an option, the fabricating method 2000 of the 3D memory provided herein may further include forming a top select gate structure on the stack structure; and forming a second semiconductor fill layer (or a second semiconductor thin film layer) in the top select gate structure and connected with the channel layer, wherein the channel layer has a first conductive type impurity. The second semiconductor fill layer (or the second semiconductor thin film layer) has a second conductive type impurity opposite to the first conductive type impurity.

Since the contents and structures involved in the manufacturing process of the manufacturing method 3000 of the 3D memory described below may be fully or partially applicable to the contents and structures involved in the manufacturing process of the second semiconductor fill layer (or the second semiconductor thin film layer) in the manufacturing method of the 3D memory described herein including both the first semiconductor fill layer (or the first semiconductor thin film layer) and the second semiconductor fill layer (or the second semiconductor thin film layer), the contents related to or similar thereto will not be repeated.

Figure 6:
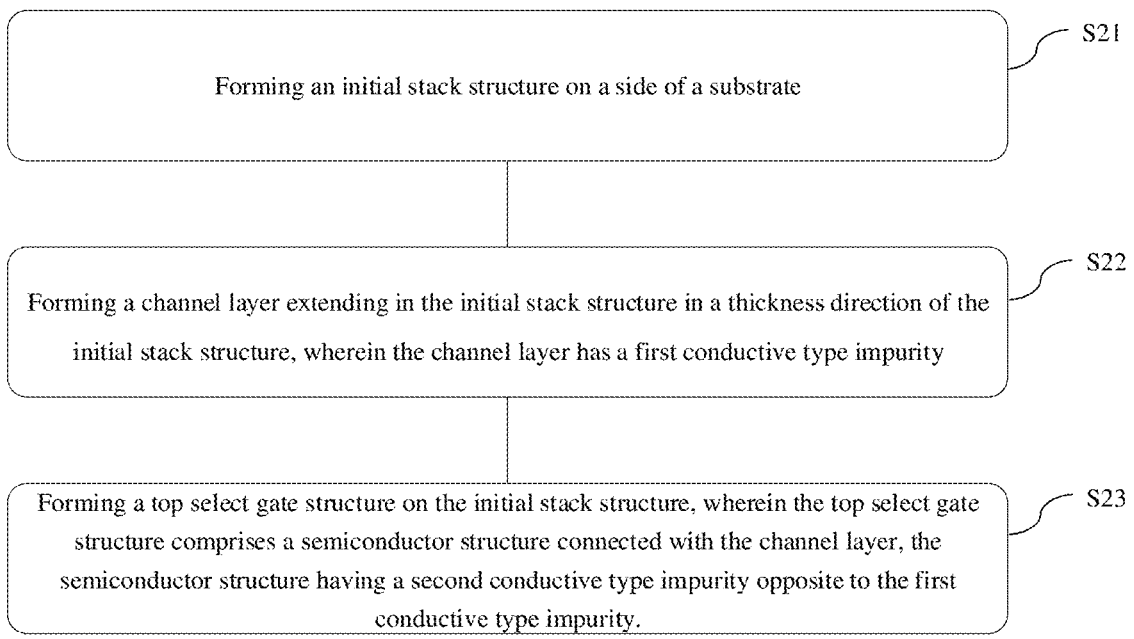
FIG. 6 is a flowchart of a manufacturing method of a 3D memory according to another implementation of the present disclosure.

FIG. 6 is a flowchart of a manufacturing method 3000 of a 3D memory according to another implementation of the present disclosure. FIGS. 7A to 7D are respectively process diagrams of a manufacturing method 3000 of a 3D memory according to an implementation of the present disclosure.

The manufacturing method 3000, as shown in FIG. 6, includes the following steps:

S21: forming an initial stack structure on a side of the substrate.

S22: forming a channel layer extending in the initial stack structure in the thickness direction of the initial stack structure, wherein the channel layer has a first conductive type impurity.

S23: forming a top select gate structure on the initial stack structure, wherein the top select gate structure includes a semiconductor structure connected with the channel layer. The semiconductor structure has a second conductive type impurity opposite to the first conductive type impurity.

The specific processes of each step of the above-described manufacturing method 3000 will be described in detail below with reference to FIGS. 2, 7A to 7D.

Figure 7A:
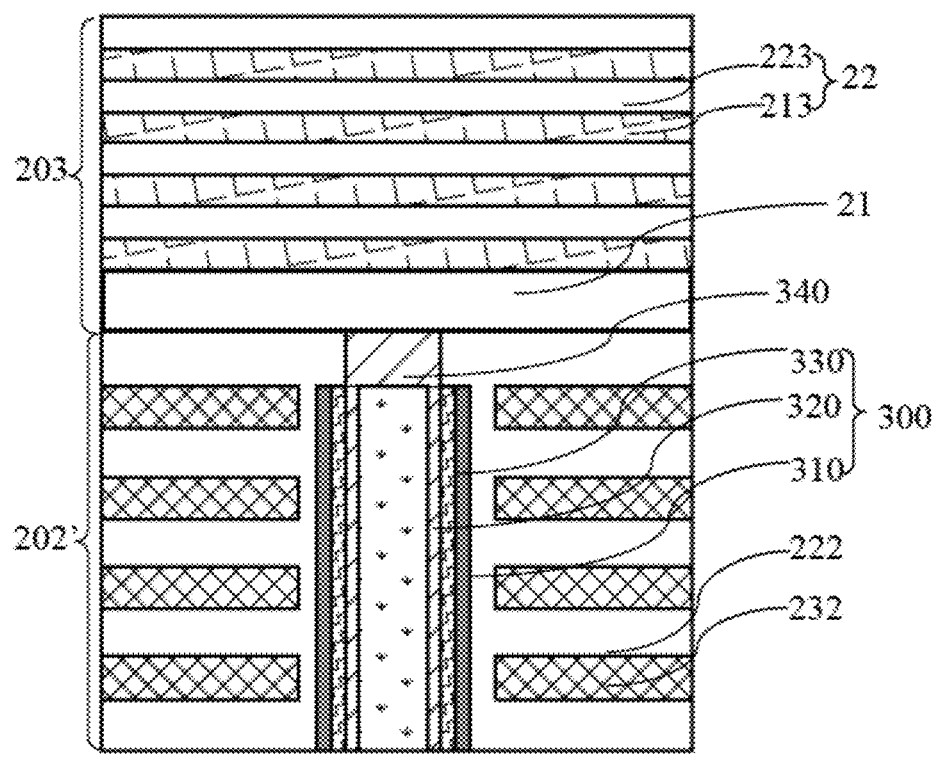
FIGS. 7A to 7D are respectively process diagrams of a manufacturing method of a 3D memory according to another implementation of the present disclosure.

FIG. 7A is a schematic cross-sectional view of a 3D memory after forming a top select gate structure 203 according to an implementation of the present disclosure.

As shown in FIG. 7A, forming the stack structure on a side of the substrate in Step S21 may include, for example: providing the substrate; and forming an initial stack structure 202' on the substrate.

Particularly, in an implementation of the present disclosure, the manufacturing material for substrate may be selected from any suitable semiconductor material, for example, monocrystalline silicon (Si), monocrystalline germanium (Ge), silicon germanium (GeSi), silicon carbide (SiC), silicon on insulator (SOI), germanium on insulator (GOI) or gallium arsenide and other compounds in Group III-V. Further, the substrate may be monocrystalline silicon.

In an implementation of the present disclosure, the substrate may be, for example, a composite substrate for supporting a device structure thereon. A plurality of layers made of different materials may be sequentially disposed to form the substrate by a thin film deposition process such as chemical vapor deposition (CVD), physical vapor deposition (PVD), atomic layer deposition (ALD), or any combination thereof.

The substrate may include a substrate sacrificial layer for subsequent formation of the semiconductor connect layer. The substrate sacrificial layer may include a single layer, a plurality of layers or a suitable composite layer. For example, the substrate sacrificial layer may include any one or more of a silicon oxide layer, a silicon nitride layer, and a silicon oxynitride layer. As an option, the substrate sacrificial layer may be a high dielectric constant dielectric layer. As another option, the substrate sacrificial layer may include a dielectric layer, a sacrificial layer, and a dielectric layer provided in sequence, wherein the dielectric layer may be a silicon nitride layer, and the sacrificial layer may be a silicon oxide layer. As another option, the substrate sacrificial layer may include any one or more of a dielectric material, a semiconductor material, and a conductive material. For example, the sacrificial layer may be monocrystalline silicon or polysilicon. Specifically, an exemplary material forming the sacrificial layer in an implementation of the present disclosure may be polysilicon.

Partial regions of the substrate may also form well regions doped by an N-type or P-type dopant via an ion implantation or diffusion process. The dopant may include any one or combination of phosphorus (P), arsenic (As), and antimony (Sb). In some implementations of the present disclosure, the well regions may be made with the same dopant or different dopants. Further, the doping concentration of the well regions may be the same or different, and this is not limited by the present disclosure.

The substrate has opposite first and second sides. As an option, after forming the substrate, a bottom select gate structure may be formed on a first side of the substrate by one or more thin film deposition processes, and then an initial stack structure 202' may be formed on a top surface of the bottom select gate structure away from the substrate by one or more thin film deposition processes. The thin film deposition process may include, but is not limited to, chemical vapor deposition (CVD), physical vapor deposition (PVD), atomic layer deposition (ALD), or any combined thin film deposition process thereof, or any combination thereof, which is not limited herein. In this implementation, the first semiconductor fill layer (or the first semiconductor thin film layer) described above may be formed in the bottom select gate structure according to different settings of the 3D architecture and actual needs.

As another option, the initial stack structure 202' may also be formed directly on the first side of the substrate by one or more thin film deposition processes. The thin film deposition process may include, but is not limited to, chemical vapor deposition (CVD), physical vapor deposition (PVD), atomic layer deposition (ALD), or any combined thin film deposition process, thereof, or any combination thereof, which is not limited herein. In this implementation, the initial stack structure 202' includes a plurality of stack layers formed by stacking insulating layers and gate sacrificial layers. A portion of the stack layer near the substrate in the initial stack structure 202' may be used as a bottom select gate structure for forming a bottom select gate (BSG) of a 3D memory.

The contents and structures involved in the manufacturing process of the manufacturing method 3000 of the 3D memory described below may be fully or partially applicable to the structures described in the above two options.

The initial stack structure 202' may include a plurality of pairs of insulating layers 222 and gate sacrificial layers 232 alternately stacked on each other. For example, the initial stack structure 202' may include 64 pairs, 128 pairs, or more than 128 pairs of insulating layers 222 and gate sacrificial layers 232.

In some implementations, the insulating layer 222 and the gate sacrificial layer 232 may include a first dielectric material and a second dielectric material different from the first dielectric material, respectively. Exemplary materials used to form the insulating layer 222 and the gate sacrificial layer 232 may include silicon oxide and silicon nitride, respectively. The silicon oxide layer may be used as the isolation stack layer, and the silicon nitride layer may be used as the sacrificial stack layer. The sacrificial stack layer may then be etched away and replaced with a conductor layer comprising a conductive material.

The manufacturing method of a single stack structure is described above. In fact, with the increasing demand for 3D memory storage capacity, the memory stack layer is gradually increasing. In order to break through the limitations of the process limits, a plurality of sub-stack structures may be sequentially stacked in the thickness direction of the stack structures by using a double stack technique or a multi-stack technique to form the stack structure, wherein each sub-stack structure may include a plurality of insulating layers and gate sacrificial layers alternately stacked. The number of layers of each sub-stack structure may be the same or different. The contents and structures involved in the process of manufacturing a single stack structure described above may be fully or partially applicable to a stack structure formed by a plurality of sub-stack structures described herein. Therefore, contents related to or similar thereto will not be repeated. However, it will be understood by those skilled in the art that subsequent fabrication processes may be performed on the basis of a multi-stack structure or a single stack structure.

Referring again to FIG. 7A, Step S22: forming a channel layer extending in the initial stack structure in the thickness direction of the initial stack structure, wherein the channel layer has a first conductive type impurity, S22 may include, for example: forming a channel hole 310 extending in the initial stack structure 202' in the thickness direction of the initial stack structure 202'; forming a functional layer 320 and a channel layer 330 having a first conductive type impurity sequentially on the inner walls of the channel hole 310; and forming a channel plug 340 above the channel layer 330.

The channel hole 310 may be formed by, for example, a dry etching process or a combination of dry and wet etching processes. Other manufacturing processes, such as patterning processes including photolithography, cleaning, and chemical mechanical polishing may also be performed. The channel hole 310 may extend in the initial stack structure 202' in the thickness direction of the initial stack structure 202'. As an option, the channel hole 310 may have a cylindrical or pillar shape through the initial stack structure 202'.

The functional layer 320 may include a block layer formed on the inner walls of the channel hole 310 to block charge outflow, a charge trapping layer formed on the surface of the block layer to store charge during the operation of the 3D memory, and a tunneling layer formed on the surface of the charge trapping layer. The functional layer 320 may be formed on the inner walls of the channel hole 310 by a thin film deposition process such as chemical vapor deposition (CVD), physical vapor deposition (PVD), atomic layer deposition (ALD), or any combination thereof.

In some implementations, the functional layer 320 may include an oxide-nitride-oxide (ONO) structure. However, in some other implementations, the functional layer 320 may have a different structure than the ONO configuration. For example, the functional layer 320 may include a silicon oxide layer, a silicon nitride layer, and another silicon oxide layer.

The channel layer 330 can be used to transport desired charges (electrons or holes). According to an exemplary implementation of the present disclosure, the channel layer 330 may be formed on the surface of the tunneling layer by a thin film deposition process such as chemical vapor deposition (CVD), physical vapor deposition (PVD), atomic layer deposition (ALD), or any combination thereof.

In some implementations, the channel layer 330 may comprise silicon, such as polysilicon or monocrystalline silicon. The channel layer 330 has the first conductive type impurity. For example, the material forming the channel layer 330 may include, but is not limited to, N-type doped polysilicon. The channel layer 330, similar to the channel hole 310, may extend in the initial stack structure 202' in the thickness direction of the initial stack structure 202'. Further, as an option, a channel layer 330 may also be through the initial stack structure 202'.

The functional layer 320 and the channel layer 330 located on the inner walls of the channel hole 310 form a channel structure 300.

Further, the 3D memory further includes a channel plug 340 formed at the top of the channel hole away from the substrate 110. In other words, the channel plug 340 may be formed above the channel layer 330. The channel plug 340 may be manufactured using the same material as the channel layer 330, such as N-type doped polysilicon or the like. Further, the doping concentration of the conductive impurity of the channel plug 340 should be higher than that the channel layer 330.

Figure 7B:
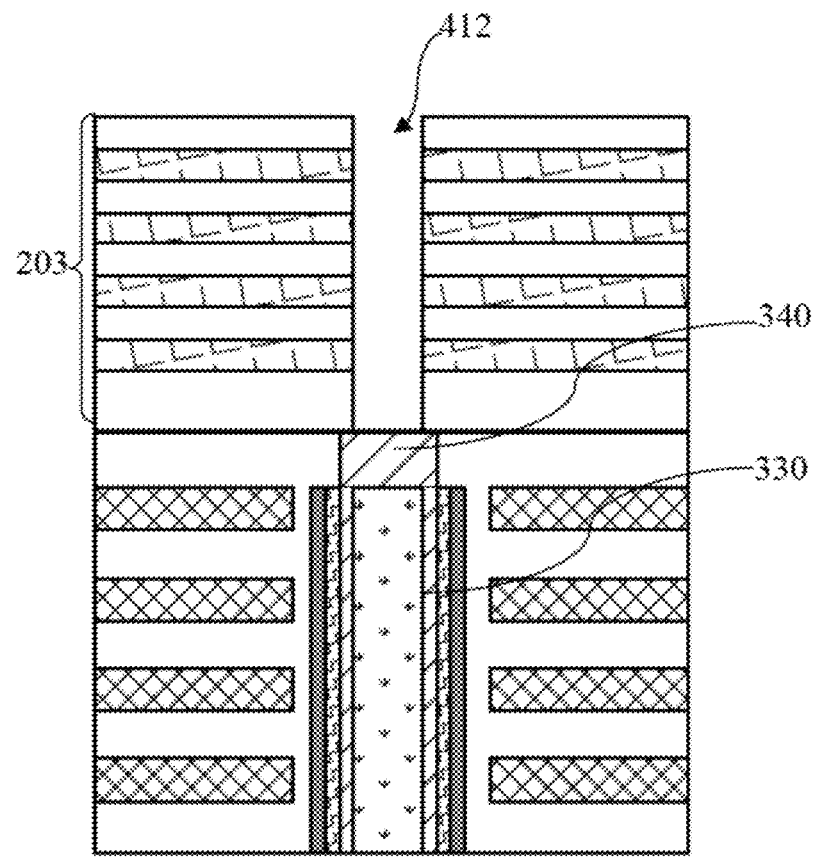
Figure 7C:
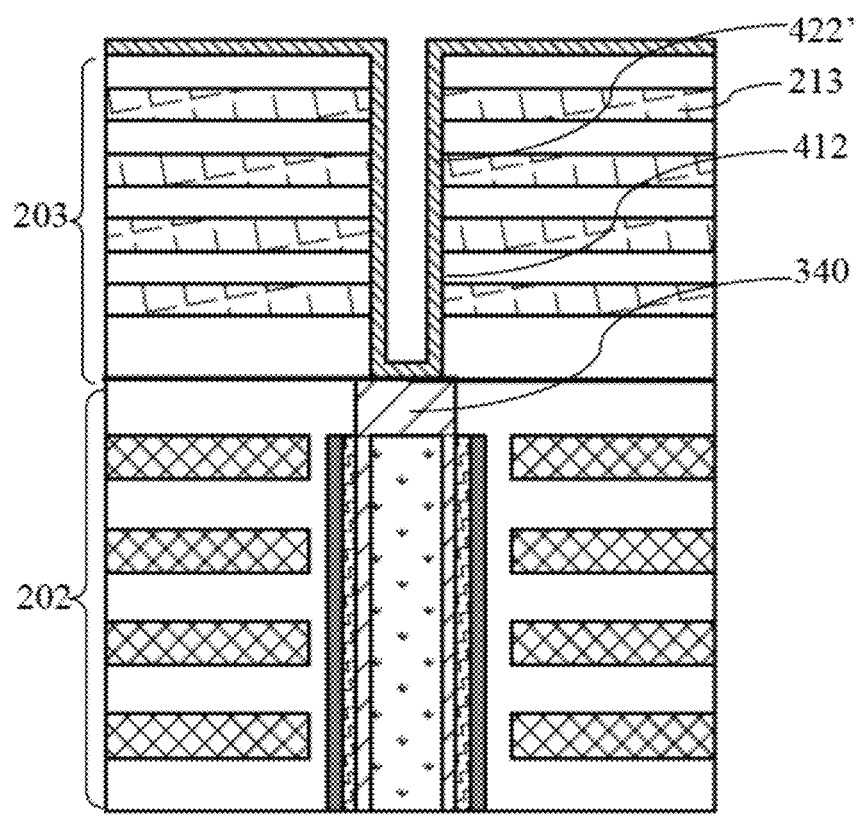
Figure 7D:
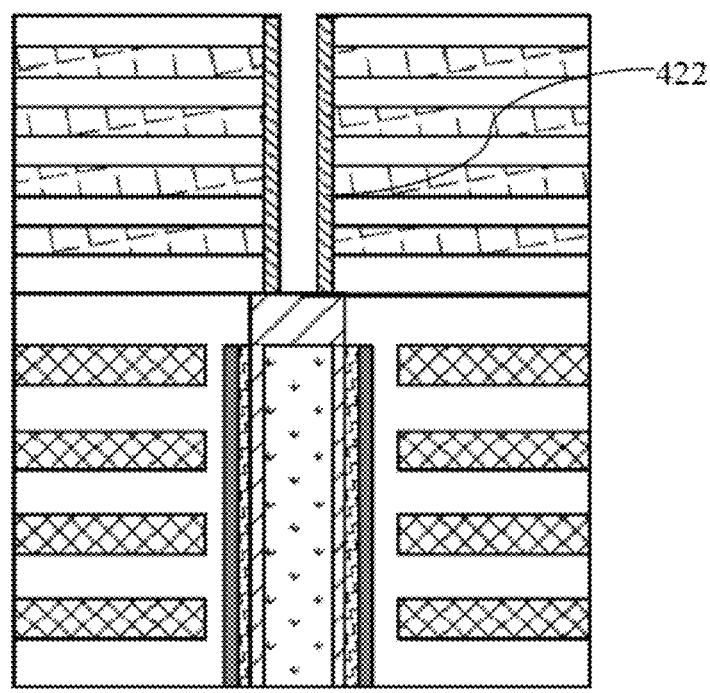

FIG. 7B is a schematic cross-sectional view of a 3D memory after forming a second vertically-extending hole 412 in the top select gate structure 203 according to an implementation of the present disclosure. FIG. 7C is a schematic cross-sectional view of a 3D memory after an initial second barrier layer 422' is formed on the inner walls of the second vertically-extending hole 412 according to an implementation of the present disclosure. FIG. 7D is a schematic cross-sectional view of a 3D memory after the second barrier layer 422 is formed on the inner walls of the second vertically-extending hole 412 according to an implementation of the present disclosure.

Referring to FIGS. 1A, 1, and 2, and FIGS. 7A to 7D, step S23: forming a top select gate structure on the stack structure, wherein the top select gate structure including a semiconductor structure connected with the channel layer, the semiconductor structure having a second conductive type impurity opposite the first conductive type impurity, step S23 may include, for example: forming a top select gate structure 203 on the initial stack structure 202'; and forming a second semiconductor fill layer 432 (or the second semiconductor thin film layer 432-1) connected with the channel layer 330 in the top select gate structure 203, wherein the second semiconductor fill layer 432 (or the second semiconductor thin film layer 432-1) having a second conductive type impurity opposite to the first conductive type impurity.

In particular, the top select gate structure 203 may be formed on a side of the initial stack structure 202' away from the substrate by one or more thin film deposition processes. The thin film deposition process may include, but is not limited to, chemical vapor deposition (CVD), physical vapor deposition (PVD), atomic layer deposition (ALD), or any combined thin film deposition process thereof, or any combination thereof, which is not limited herein.

The top select gate structure 203 may include at least one second stack layer 22. As an option, the top select gate structure 203 may also include at least two second stack layers 22. Each second stack layer 22 may include one top select gate layer 213 and one top dielectric layer 223. It should be understood by those in the art that the top select gate structure may include only one second stack layer or may include a plurality of second stack layers without departing from the technical schemes claimed herein. In other words, the composition, structure and generation process of the top select gate structure may be changed to achieve the various results and advantages described in this specification. Since the contents and structures involved in the manufacturing process of the 3D memory including the second semiconductor structure described below may be fully or partially applicable to the above-mentioned 3D memory having the top select gate structure with a different number of layers, the manufacturing method of a 3D memory including a plurality of second stack layers is described in details below, and the related or similar contents in the manufacturing method of a 3D memory including only one second stack layer are not repeated.

Further, as an option, the top select gate structure 203 may also include a top isolation layer 21. The top isolation layer 21 may first be formed on a side of the initial stack structure 202' away from the substrate by one or more thin film deposition processes prior to forming the second stack layer 22. At least one second stack layer 22 may be formed on the surface of the top isolation layer 21 by one or more thin film deposition processes after the formation of the top isolation layer 21.

The thin film deposition process may include, but is not limited to, chemical vapor deposition (CVD), physical vapor deposition (PVD), atomic layer deposition (ALD), or any combined thin film deposition process thereof, or any combination thereof, which is not limited herein. In other words, the top isolation layer 21 may be disposed between the initial stack structure 202' and the second stack layer 22, the top isolation layer 21 including, but not limited to, a layer of insulating dielectric material such as a silicon oxide layer.

As an option, the top select gate layer 213 may be made from a metal material which may be, for example, any one or combination of tungsten (W), cobalt (Co), copper (Cu), and aluminum (Al). As another option, the top select gate layer 213 may also be a semiconductor gate layer which may be a doped crystalline silicon layer such as a highly doped polysilicon layer or a silicide layer, which is not limited herein. The top dielectric layer 223 may be made from a dielectric material. Exemplary materials for forming the top dielectric layer 223 may include silicon oxide.

In an implementation of the present disclosure, the in-situ doping process can also be used to form the semiconductor gate layer described above. The semiconductor gate layer can be highly doped during deposition by the in-situ doping process. When the semiconductor gate layer 213 has a greater doping concentration of impurity than the second semiconductor fill layer formed subsequently, the bulk resistivity of the top select gate layer can be reduced, and the conductivity of the top select gate layer can be improved. For example, in a case where the impurity doping concentration of the second semiconductor fill layer is $10^{13}$ cm$^{-3}$ to $10^{15}$ cm$^{-3}$, the impurity doping concentration of the semiconductor gate layer 213 may be set to $10^{19}$ cm$^{-3}$ to $10^{21}$ cm$^{-3}$.

As shown in FIG. 2, FIGS. 7B to 7D, forming a second semiconductor fill layer 432 having a second conductive type impurity may include, for example: forming a second vertically-extending hole 412; forming an initial second barrier layer 422' on the inner walls of the second vertically-extending hole 412; forming a second barrier layer 422; and filling the remaining space of the second vertically-extending hole 412 to form the second semiconductor fill layer 432 and the conductive plug 500, wherein the conductive plug 500 is located above the second semiconductor fill layer 432.

In an implementation of the present disclosure, the second semiconductor fill layer 432 may be formed in the top select gate structure 203 after the formation of the top select gate structure 203. In particular, the second vertically-extending hole 412 may be formed by, for example, a dry etching process or a combination of dry and wet etching processes as shown in FIG. 7A and FIG. 7B. Further, other manufacturing processes, such as patterning processes, including photolithography, cleaning and chemical mechanical polishing may also be performed. The second vertically-extending hole 412 may extend in the top select gate structure 203 in the thickness direction of the second stack layer 22. As an option, the second vertically-extending hole 412 may have a cylindrical or pillar shape through the top select gate structure 203.

As an option, the process of forming the second vertically-extending hole 412 may stop at the channel plug 340.

As shown in FIG. 7C, the initial second barrier layer 422' may be formed on the inner walls (sidewalls and bottom surface) of the second vertically-extending hole 412 by a thin film deposition process such as chemical vapor deposition (CVD), physical vapor deposition (PVD), atomic layer deposition (ALD) or any combined thin film deposition process thereof, or any combination thereof after forming the second vertically-extended hole 412. Further, the initial second barrier layer 422' may be formed not only on the inner walls of the second vertically-extending hole 412 but also on the top surface of the top select gate structure 203 away from the stack structure 202. As an option, when the top select gate layer 213 is a semiconductor gate layer, an oxide layer may be formed on the inner wall (sidewalls) of the second vertically-extending hole 412 as an initial second barrier layer 422' by an oxidation process.

As shown in FIGS. 7C and 7D, after forming the initial second barrier layer 422', portions of the initial second barrier layer 422' located on the top surface of the top select gate structure 203, and portions of the initial second barrier layer 422' located on the bottom surface of the second vertically-extending hole 412 may be removed by, for example, a dry etching process or a combination of dry and wet etching processes or other manufacturing processes such as a patterning process including photolithography, cleaning and/or chemical mechanical polishing (CMP) to form the second barrier layer 422. After the above processes, the second barrier layer 422 is located only on the side walls of the second vertically-extending hole 412.

As shown in FIG. 2, as an option, the second semiconductor fill layer 432 having a second conductive type impurity and the conductive plug 500 having a first conductive type impurity may be filled in the remaining portion of the second vertically-extending hole 412 by, for example, an in-situ doping process after the formation of the second barrier layer 422. The conductive plug 500 is located above the second semiconductor fill layer 432. The second semiconductor fill layer 432 filled below the conductive plug 500 may be connected with the channel layer 330 through the channel plug 340.

A PN junction barrier capacitance may be formed in a conductive circuit connecting the channel layer by providing a second semiconductor fill layer having an impurity of the opposite conductive type to the channel layer in the top select gate structure. Therefore, the width of the space charge region in the PN junction barrier capacitance can be changed by applying a control trigger voltage to the top select gate structure, so that the turn-on/turn-off performance of the 3D memory can be optimized by controlling the turn-on speed of the channel layer through modulating the width of the space charge region above described according to the requirements of the erasing, programming and reading operation of the 3D memory.

Further, it can be understood that the second semiconductor fill layer formed in the above manner is a solid semiconductor structure. The second semiconductor fill layer having the solid semiconductor structure can enhance the gate controllability of the top select gate structure in controlling the turn-on speed of the channel layer while simplifying the manufacturing process of the 3D memory. Particularly, in this implementation, only a one-step filling process is used to fill up the below space in the vertically-extending hole except the second barrier layer to form a second semiconductor fill layer. Therefore, there is no need to use an additional process to form other fill structures (for example, the filling process for forming an insulating dielectric fill layer) in the vertically-extending hole, which simplifies the manufacturing process of the 3D memory. Further, in an implementation of the present disclosure, the doping concentration of the second semiconductor fill layer 431 may range from $10^{13}$ cm$^{-3}$ to $10^{15}$ cm$^{-3}$. The impurity doping concentrations of the conductive plug 500 and the channel plug 340 may be set from $10^{19}$ cm$^{-3}$ to $10^{21}$ cm$^{-3}$. Setting the impurity doping concentrations of both the conductive plug and the channel plug to be greater than that of the second semiconductor fill layer can reduce the leakage existing in the top select gate structure.

Further, referring to FIG. 1B, as another option, in another implementation of the present disclosure, the initial second semiconductor thin film layer (now shown) having a second conductive type impurity may be formed on the surface of the second barrier layer 422 by for example an in-situ doping process after the second barrier layer 422 is formed on the inner walls of the second vertically-extending hole 412. An initial insulating dielectric fill layer (not shown) may be filled in the remaining space of the second vertically-extending hole 412 using a thin film deposition process such as chemical vapor deposition (CVD), physical vapor deposition (PVD), atomic layer deposition (ALD) or any combined thin film deposition process thereof, or any combination thereof. After the initial second semiconductor thin film layer and the initial insulating dielectric fill layer are formed, a portion of the initial second semiconductor thin film layer and the initial insulating dielectric fill layer above described may be removed to form the second semiconductor thin film layer 432-1 and the second insulating dielectric fill layer 442-1 and expose the surface of the second barrier layer 422 located above the second vertically-extending hole 412 (which can be understood as an end of the second vertically-extending hole 412 remote from the stack structure 202). Thereafter, a conductive plug 500 having a first conductive type impurity is formed on the surface of the exposed second barrier layer 422 by, for example, an in-situ doping process. The conductive plug 500 fills up above the second vertically-extending hole 412 and is connected with the second semiconductor thin film layer 432-1.

It can be understood that the second semiconductor thin film layer formed by this implementation is a hollow semiconductor structure (the hollow portion is filled with the second insulating dielectric fill layer 442-1). The second semiconductor thin film layer having a hollow semiconductor structure is connected with the channel layer. Since the conductive types of the second semiconductor thin film layer and the channel layer are opposite, a PN junction barrier capacitance can be formed in a conductive circuit connecting the channel layer. Therefore, the width of the space charge region in the PN junction barrier capacitance is changed by applying a control trigger voltage to the top select gate structure. In turn, it can be achieved that the turn-on/turn-off performance of the 3D memory can be optimized by controlling the turn-on speed of the channel layer through modulating the width of the space charge region above described according to the requirements of the erasing, programming and reading operation of the 3D memory.

As an option, the impurity doping concentration of the second semiconductor thin film layer may be a range of $10^{13}$ cm$^{-3}$ to $10^{15}$ cm$^{-3}$. The impurity doping concentrations of the conductive plug and the channel plug can be set from $10^{19}$ cm$^{-3}$ to $10^{21}$ cm$^{-3}$. Setting the impurity doping concentrations of both the conductive plug and the channel plug to be greater than that of the second semiconductor thin film layer can reduce the leakage existing in the top select gate structure.

Figure 8:
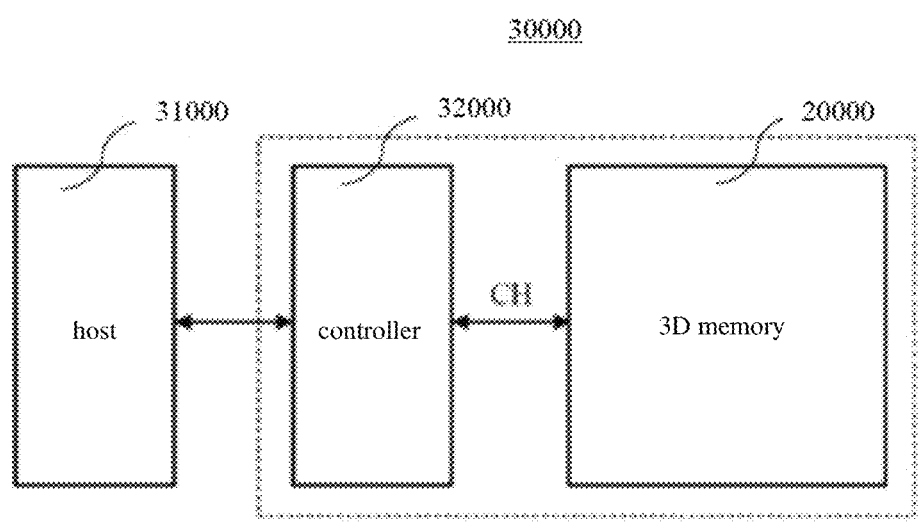
FIG. 8 is a structure diagram of a memory system according to an implementation of the present disclosure.

FIG. 8 is a schematic structural diagram of a memory system 30000 according to an implementation of the present disclosure.

As shown in FIG. 8, at least one implementation of yet another aspect of the present disclosure also provides a memory system 30000. The memory system 30000 may include a memory 20000 and a controller 32000. The memory 20000 may be identical to the memory described in any of the above implementations, which is not repeated herein. The memory system 30000 may be a two-dimensional memory system or a three-dimensional memory system. Taking the three-dimensional memory system as an example to illustrate below.

The 3D memory system 30000 may include a 3D memory 20000, a host 31000, and a controller 32000. The 3D memory 20000 may be identical to the 3D memory described in any of the above implementations, which is not repeated herein. The controller 32000 may control the 3D memory 20000 through the channel CH, and the 3D memory 20000 may perform operations based on the control of the controller 32000 in response to a request from the host 31000. The 3D memory 20000 may receive the command CMD and the address ADDR from the controller 32000 through the channel CH, and access an area selected from the memory cell array in response to the address. In other words, the 3D memory 20000 may perform internal operations corresponding to commands on the area selected by the address.

In some implementations, the 3D memory system may be implemented as a multimedia card (such as in the form of a universal flash memory (UFS) device, a solid-state drive (SSD), a MMC, an eMMC, a RS-MMC and a miniature MMC), a secure digital card (such as in the form of a SD, a mini SD, and a miniature SD), a memory device of Personal Computer Memory Card International Association (PCMCIA) card type, a memory device of peripheral component interconnect (PCI) type, a memory device of high speed PCI (PCI-E) type, a compact flash (CF) card, a smart media card or a memory stick and the like. The peripheral circuit, the memory, and the memory system provided by the present disclosure have the same beneficial effects as the semiconductor structure provided by the present disclosure due to the arrangement of the semiconductor structure provided by the present disclosure, which are not repeated herein.

Although exemplary manufacturing methods and structures of a 3D memory are described herein, it is understood that one or more features may be omitted, substituted, or added from the structure of the 3D memory. For example, the gate sacrificial layer in the initial stack structure is removed to form a stack structure including the gate layer. Further, the materials of the layers exemplified are exemplary only.

The above description is only a description of some implementation of the present disclosure and of the technical principles employed. It should be understood by those skilled in the art that the scope of protection referred to in the present disclosure is not limited to technical solutions formed by specific combinations of the above technical features, but also encompasses other technical solutions formed by any combination of the above technical features or their equivalents without departing from the technical concept. For example, a technical solution may be formed by replacing the above features with the technical features with similar functions disclosed in the present disclosure (but not limited to).

What is claimed is:

1. A three-dimensional memory, comprising:
   a bottom select gate structure;
   a stack structure disposed on the bottom select gate structure and comprising a channel layer extending in the stack structure in a first direction, the channel layer having a first conductive type impurity, the first direction being a direction of a thickness of the stack structure; and
   a top select gate structure disposed on the stack structure, wherein
   at least one of the bottom select gate structure or the top select gate structure comprises a semiconductor structure extending in the first direction and connected with the channel layer, the semiconductor structure having a second conductive type impurity different from the first conductive type impurity;
   the bottom select gate structure comprises at least one first stack layer each comprising a bottom select gate layer and a bottom dielectric layer;
   the top select gate structure comprises at least one second stack layer each comprising a top select gate layer and a top dielectric layer;
   at least one of the bottom select gate layer or the top select gate layer is a semiconductor gate layer; and
   an impurity doping concentration of the semiconductor gate layer is greater than an impurity doping concentration of the semiconductor structure.

2. The three-dimensional memory of claim 1, wherein the semiconductor structure is a first semiconductor fill layer disposed in the bottom select gate structure; and the bottom select gate structure comprises:
   the first semiconductor fill layer extending in the first direction; and
   a first barrier layer disposed on a sidewall of the first semiconductor fill layer.

3. The three-dimensional memory of claim 1, wherein the semiconductor structure is a first semiconductor thin film layer disposed in the bottom select gate structure; and the bottom select gate structure comprises:
   a first insulating dielectric fill layer extending in the first direction; and
   the first semiconductor thin film layer and a first barrier layer, in sequence, disposed on a sidewall of the first insulating dielectric fill layer.

4. The three-dimensional memory of claim 1, wherein the semiconductor structure is a first semiconductor fill layer or a first semiconductor thin film layer;
   the three-dimensional memory further comprises a semiconductor connect layer located below and connected with the first semiconductor fill layer or the first semiconductor thin film layer; and
   the semiconductor connect layer has the first conductive type impurity.

5. The three-dimensional memory of claim 4, wherein an impurity doping concentration of the semiconductor connect layer is greater than an impurity doping concentration of the first semiconductor fill layer or the first semiconductor thin film layer.

6. The three-dimensional memory of claim 1, wherein the semiconductor structure is a second semiconductor fill layer disposed in the top select gate structure; and the top select gate structure comprises:
   the second semiconductor fill layer extending in the first direction, and a conductive plug located above the second semiconductor fill layer and connected with the second semiconductor fill layer; and
   a second barrier layer disposed on a sidewall of the second semiconductor fill layer.

7. The three-dimensional memory of claim 1, wherein the semiconductor structure is a second semiconductor thin film layer disposed in the top select gate structure; the top select gate structure comprises:
   a second insulating dielectric fill layer extending in the first direction; and
   the second semiconductor thin film layer and a second barrier layer, in sequence, disposed on a sidewall of the second insulating dielectric fill layer, a conductive plug being located above the second semiconductor thin film layer and the second insulating dielectric fill layer and connected with the second semiconductor thin film layer.

8. The three-dimensional memory of claim 7, wherein
the semiconductor structure is a second semiconductor fill layer or the second semiconductor thin film layer, disposed in the top select gate structure;
the three-dimensional memory further comprises a channel plug located above the channel layer, the channel layer being connected with the second semiconductor fill layer or the second semiconductor thin film layer through the channel plug; and
both the conductive plug and the channel plug have the first conductive type impurity.

9. The three-dimensional memory of claim 8, wherein impurity doping concentrations of both the conductive plug and the channel plug are greater than an impurity doping concentration of the second semiconductor fill layer or the second semiconductor thin film layer.

10. The three-dimensional memory of claim 1, wherein
one of the bottom select gate layer and the top select gate layer is a semiconductor gate layer; and
another one of the bottom select gate layer or the top select gate layer is a metal gate layer.

11. The three-dimensional memory of claim 1, wherein
the semiconductor structure is a first semiconductor fill layer or a first semiconductor thin film layer located in the bottom select gate structure;
the three-dimensional memory further comprises a semiconductor connect layer located below and connected with the first semiconductor fill layer or the first semiconductor thin film layer;
the first semiconductor fill layer or the first semiconductor thin film layer has an impurity doping concentration of $10^{13}$ cm$^{-3}$ to $10^{15}$ cm$^{-3}$;
the semiconductor connect layer has an impurity doping concentration of $10^{19}$ cm$^{-3}$ to $10^{21}$ cm$^{-3}$; and
the semiconductor gate layer has an impurity doping concentration of $10^{19}$ cm$^{-3}$ to $10^{21}$ cm$^{-3}$.

12. The three-dimensional memory of claim 1, wherein
the semiconductor structure is a second semiconductor fill layer or a second semiconductor thin film layer located in the top select gate structure;
the three-dimensional memory further comprises:
a conductive plug located above and connected with the second semiconductor fill layer or the second semiconductor thin film layer; and
a channel plug located above the channel layer, the channel layer being connected with the second semiconductor fill layer or the second semiconductor thin film layer through the channel plug;
the second semiconductor fill layer or the second semiconductor thin film layer has an impurity doping concentration of $10^{13}$ cm$^{-3}$ to $10^{15}$ cm$^{-3}$;
the conductive plug and the channel plug have impurity doping concentrations of $10^{19}$ cm$^{-3}$ to $10^{21}$ cm$^{-3}$; and
the semiconductor gate layer has an impurity doping concentration of $10^{19}$ cm$^{-3}$ to $10^{21}$ cm$^{-3}$.

13. The three-dimensional memory of claim 1, wherein
the bottom select gate structure comprises at least two of the at least one first stack layer; or
the top select gate structure comprises at least two of the at least one second stack layer.

14. The three-dimensional memory of claim 1, wherein
the semiconductor structure is one of a second semiconductor fill layer or a second semiconductor thin film layer, located in the top select gate structure; and
the three-dimensional memory further comprises a channel plug located above the channel layer and connected with the one of the second semiconductor fill layer or the second semiconductor thin film layer through the channel plug, the channel plug being arranged between the channel layer and the one of the second semiconductor fill layer or the second semiconductor thin film layer.

15. The three-dimensional memory of claim 1, wherein
the semiconductor structure is one of a second semiconductor fill layer or a second semiconductor thin film layer, located in the top select gate structure; and
a conductive plug is disposed above the one of the second semiconductor fill layer or the second semiconductor thin film layer, a second barrier layer surrounding sidewalls of the conductive plug and the one of the second semiconductor fill layer or the second semiconductor thin film layer.

16. The three-dimensional memory of claim 1, wherein
the semiconductor structure is one of a first semiconductor fill layer or a first semiconductor thin film layer, located in the bottom select gate structure; and
the three-dimensional memory further comprises a semiconductor connect layer, the one of the first semiconductor fill layer or the first semiconductor thin film layer extending in the first direction into the semiconductor connect layer.

17. The three-dimensional memory of claim 16, wherein a first barrier layer is configured to surround a sidewall of the one of the first semiconductor fill layer or the first semiconductor thin film layer, without extending into the semiconductor connect layer.

18. The three-dimensional memory of claim 1, wherein the bottom select gate structure is aligned with the top select gate structure.

19. The three-dimensional memory of claim 1, wherein each of the bottom select gate layer and the top select gate layer is a semiconductor gate layer.

20. A memory system, comprising:
a three-dimensional memory comprising:
a bottom select gate structure;
a stack structure disposed on the bottom select gate structure and comprising a channel layer extending in the stack structure in a first direction, the channel layer having a first conductive type impurity, the first direction being a direction of a thickness of the stack structure; and
a top select gate structure disposed on the stack structure,
wherein
at least one of the bottom select gate structure or the top select gate structure comprises a semiconductor structure extending in the first direction and connected with the channel layer, the semiconductor structure having a second conductive type impurity different from the first conductive type impurity;
the bottom select gate structure comprises at least one first stack layer each comprising a bottom select gate layer and a bottom dielectric layer;
the top select gate structure comprises at least one second stack layer each comprising a top select gate layer and a top dielectric layer;
at least one of the bottom select gate layer or the top select gate layer is a semiconductor gate layer; and
an impurity doping concentration of the semiconductor gate layer is greater than an impurity doping concentration of the semiconductor structure; and a controller coupled to the three-dimensional memory and configured to control the three-dimensional memory to store data.

\* \* \* \* \*